(12) United States Patent
Tanaka

(10) Patent No.: US 6,384,555 B1
(45) Date of Patent: May 7, 2002

(54) DC MOTOR DRIVING APPARATUS

(75) Inventor: Kunio Tanaka, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 09/559,526

(22) Filed: Apr. 28, 2000

(30) Foreign Application Priority Data

Apr. 28, 1999 (JP) .......................................... 11-122929
Apr. 4, 2000 (JP) ...................................... 2000-102707

(51) Int. Cl.⁷ ............................ H02P 1/00; H02P 1/22; H02P 1/40; H02P 3/00; H02P 5/00
(52) U.S. Cl. ...................................... 318/280; 318/293
(58) Field of Search ................................ 318/280, 282, 318/291, 293

(56) References Cited

U.S. PATENT DOCUMENTS 3,919,611 A * 11/1975 Takahashi et al.
4,633,154 A * 12/1986 Maeda
4,673,852 A * 6/1987 Geiger
5,172,036 A * 12/1992 Cameron
5,306,988 A * 4/1994 Carobolante et al.
5,332,954 A * 7/1994 Lankin
5,552,684 A * 9/1996 Wada et al. .................. 318/293
5,914,576 A * 6/1999 Barba .......................... 318/282
5,977,737 A * 11/1999 Labriola, II
6,157,148 A * 12/2000 Posma ..................... 318/293 X

FOREIGN PATENT DOCUMENTS

JP    57-141695    9/1982

* cited by examiner

*Primary Examiner*—Jeffrey Donels
(74) *Attorney, Agent, or Firm*—Smith Patent Office

(57) ABSTRACT

One terminal 3a of the DC motor 3 is connected to the power supply terminal 301, and the other terminal 3b of the DC motor 3 is connected to the ground terminal 302 through the FET 1. The FET 2 is connected between the terminal 3a and terminal 3b of the DC motor 3. A reversal input terminal of the comparator 6 is connected to the terminal 3a of the DC motor 3, and a non-reversal input terminal of the comparator 6 is connected to the terminal 3b of the DC motor 3. The output terminal of the comparator 6 is connected to the gate of the FET 2 through the switch SW1. The CPU 200 supplies a control signal FV which is changed at a predetermined period T according to the speed signal supplied from the receiver 100, to the gate of the FET 2 through the driver 7. When the counter electromotive force is generated in the DC motor 3, the comparator 6 supplies a high level control signal RD to the gate of the FET 2 through the switch SW1.

16 Claims, 31 Drawing Sheets

DC MOTOR DRIVING APPARATUS

BACKGROUND OF THE INVETION

The present invention relates to a DC motor driving apparatus to drive a DC motor.

A DC motor driving apparatus to drive the DC motor is used in a toy car such as an electric radio control car. FIG. 33 is a circuit diagram showing an example of the conventional DC motor driving apparatus used in the electric radio control car.

The DC motor driving apparatus in FIG. 33 is structured by MOS type field effect transistors (hereinafter, called FET) 1 and 2. The FET 1 is used for the speed control of a DC motor 3, and the FET 2 is used for the braking of the DC motor 3. Body diodes 4 and 5 respectively exist inside the FETs 1 and 2. Incidentally, the user connects a Schottky diode 9 to a DC motor 30, or assembles it in the DC motor driving apparatus.

A power supply terminal 301 is connected to a positive electrode of the DC power supply (not shown), and a ground terminal 302 is connected to a negative electrode of the DC power supply. As the DC power supply, for example, a nickel-cadmium cell is used. One terminal 3a of the DC motor 3 is connected to the power supply terminal 301, and the other terminal 3b of the DC motor 3 is connected to the ground terminal 302 through the FET 1. The FET 2 is connected between the one terminal 3a and the other terminal 3b of the DC motor. A control signal SWA is applied on a gate of the FET 1, and a control signal SWB is applied on a gate of FET 2.

The control signal SWA varies between the high level and the low level at the time of advance of the electric radio control car. Thereby, the FET 1 repeats turning ON and OFF. At this time, the control signal SWB is fixed on the low level. Thereby, the FET 2 is turned OFF. As the result, the current flows from the power supply terminal 301 to the ground terminal 302 through the terminal 3a, DC motor 3, terminal 3b, and FET 1, and the DC motor 3 is positively rotated. When the duty ratio of the control signal SWA applied on the gate of the FET 1 is changed, the speed control of the DC motor 3 is conducted.

At the time of braking of the electric radio control car, the control signal SWA is the low level, and the control signal SWB is the high level. Thereby, the FET 1 is turned OFF, and the FET 2 is turned ON, and terminals 3a and 3b are short circuited through the FET 2. As the result, the DC motor 3 is braked.

FIG. 34 and FIG. 35 are circuit diagrams showing the other example of the conventional DC motor driving apparatus used for the electric radio control car. The DC motor driving apparatus shown in FIG. 34 and FIG. 35 is used for positively rotating and reversely rotating the DC motor, and FIG. 34 shows the operation at the time of positive rotation of the DC motor, and FIG. 35 shows the operation at the time of reversal rotation of the DC motor.

In FIG. 34 and FIG. 35, one terminal 31 of the DC motor 30 is connected to the power supply terminal 301 through FET 11, and connected to the ground terminal 302 through the FET 13. The other terminal 32 of the DC motor 30 is connected to the power supply terminal 301 through FET 12, and connected to the ground terminal 302 through the FET 14. Body diodes 21, 22, 23, and 24 respectively exist inside the FETs 11, 12, 13 and 14. The control signals SW1, SW2, Sw3 and SW4 are respectively applied on the gates of the FETs 11, 12, 13, and 14.

The control signal SW1 becomes the high level at the time of positive rotation in FIG. 34, the control signal SW2 becomes the low level, the control signal SW3 becomes the low level, and the control signal SW4 repeatedly changes between the high level and the low level. According to that, the FET 11 is turned ON, FETs 12 and 13 are turned OFF, and FET 14 repeats turned ON and OFF. As the result, as shown by an arrow, the current flows from the power supply terminal 301 to the ground terminal 302 through the FET 11, terminal 31, DC motor 30, terminal 32, and FET 14, and the DC motor 30 is positively rotated. Thereby, the electric radio control car is moved forward.

The control signal SW1 becomes the low level at the time of reversal rotation in FIG. 35, and the control signal SW2 becomes the high level, the control signal SW3 repeatedly changes between the high level and the low level, and the control signal SW4 becomes the low level. According to that, the FET 11 is turned OFF, FET 12 is turned ON, FET 13 repeats turned ON and OFF, and FET 14 are turned OFF. As the result, as shown by an arrow, the current flows from the power supply terminal 301 to the ground terminal 302 through the FET 12, terminal 32, DC motor 30, terminal 31, and FET 13, and the DC motor 30 is reversely rotated. Thereby, the electric radio control car is moved backward.

In the DC motor driving apparatus in FIG. 33, as described above, the FET 1 repeats turned ON and OFF at the time of the speed control. In this case, in the period in which the FET 1 is turned OFF, the counter electromotive force is generated in the DC motor 3. When the counter electromotive force is generated in the DC motor 3, because the drive efficiency of the DC motor 3 by the DC power supply is decreased, the regenerative current by the counter electromotive force is made to flow from the terminal 3b to the terminal 3a through the body diode 5 inside the FET 2, thereby, the counter electromotive force is eliminated.

However, because the for ward voltage of the body diode 5 is comparatively high and about 0.6 V, the heat generation occurs due to the voltage drop, and the heat loss is generated. According to this, the drive efficiency is decreased, and the nickel-cadmium cell which is the DC power supply, is consumed uselessly. As the result, the running time period of the electric radio control car is reduced.

Accordingly, in order to increase the drive efficiency, a Schottky diode 9 is connected to the DC motor 3, and the regenerative current due to counter electromotive force is made to flow from the terminal 3b to the terminal 3a through the Schottky diode 9. The forward voltage of the Schottky diode 9 is about 0.4 V, and because it is not larger than the forward voltage of the body diode 5 inside the FET 2, the regenerative current due to counter electromotive force of the DC motor 3 can be effectively made to flow.

However, a trouble for the user to connect the Schottky diode 9 to the DC motor 3 is generated. Alternatively, when the Schottky diode 9 is previously assembled in the DC motor driving apparatus, the size reduction of the DC motor driving apparatus can not be attained. It is desired that the DC motor driving apparatus is as small as possible so that the user can attach the DC motor driving apparatus to an arbitrary position of the electric radio control car.

Further, although the efficiency when the regenerative current flows to the Schottky diode 9, is improved as compared to the case where the regenerative current flows to the body diode 5 inside the FET 2, it is desired that the drive efficiency is further increased, and the heat generation amount is further decreased.

On the one hand, in the DC motor driving apparatus in FIG. 34 and FIG. 35, because 4 FETs 11 to 14 to drive the DC motor 30 positively and reversely, are used, it is difficult to decrease the size as compared to the DC motor driving apparatus in FIG. 33. Accordingly, generally, when this DC motor driving apparatus is used, the Schottky diode is not connected. Accordingly, the regenerative current due to the counter electromotive force of the DC motor 30 flows to the body diodes 21 and 22 inside the FETs 11 and 12.

In this case, because the heat generation amount due to the voltage drop is large, the drive efficiency is lowered, and nickel-cadmium cell which is the DC power supply, is consumed uselessly. As the result, the running time period of the electric radio control car is reduced.

Accordingly, in also the DC motor driving apparatus which can rotate positively and reversely, it is desired to decrease the heat generation amount and increase the drive efficiency without hindering the size reduction.

SUMMARY OF THE INVENTION

The object of the present invention is to provide a DC motor driving apparatus in which the size can be reduced and the drive efficiency is high.

(1) The First Invention

A DC motor driving apparatus according to the first invention is the DC motor driving apparatus to drive a DC motor, which comprising: a first transistor which is inserted into a current path to supply the current from a DC power supply to the DC motor, and is ON/OFF controlled; a second transistor connected between a pair of terminals of the DC motor; and a control circuit for comparing the potential of both terminals of the second transistor, and for turning ON the second transistor when the counter electromotive force is generated in the DC motor.

In the DC motor driving apparatus according to the present invention, when the first transistor is controlled to be turned ON/OFF, the current is supplied from the DC power supply to the DC motor. By controlling the ON time of the first transistor in a predetermined period, the current supplied to the DC motor can be controlled, and the rotation speed of the DC motor can be controlled.

In the OFF time of the first transistor, the counter electromotive force is generated in the DC motor. In this case, the potential of both ends of the second transistor are compared by the control means, and it is detected whether the counter electromotive force is generated in the DC motor, and when the counter electromotive force is generated in the DC motor, the second transistor can be turned ON. When the second transistor is turned ON, the regenerative current flows to the second transistor due to the counter electromotive force generated in the DC motor, and the counter electromotive force is eliminated. Because the drop voltage at the ON time of the second transistor is lower than the forward voltage of the Schottky diode, the heat generation amount is small, and the heat loss is small.

In this case, the ON time of the second transistor is controlled at the real time so that the second transistor is turned ON, only when the counter electromotive force is generated in the DC motor, corresponding to the ON time of the first transistor. Accordingly, under the condition that the regenerative current does not flow, it is prevented that the short circuit is caused between terminals of the DC motor, and the DC motor is braked.

Accordingly, the drive efficiency can be increased while the size reduction of the DC motor driving apparatus is being intended.

(2) The Second Invention

A DC motor driving apparatus according to the second invention is the DC motor driving apparatus to drive the DC motor according to the first invention, wherein the control circuit includes: a comparator by which the potential of both ends of the second transistor are compared, and which detects that the counter electromotive force is generated in said DC motor, and outputs a detection signal; and a control signal generation circuit to generate a control signal to turn ON the second transistor corresponding to the detection signal outputted from the comparator.

In this case, the potential of both ends of the second transistor are compared by the comparator to detect a counter electromotive force generated in the DC motor, and a detect signal is outputted. A control signal for turning ON the second transistor is generated by the controlling signal generating circuit corresponding to the detecting signal.

(3) The Third Invention

A DC motor driving apparatus according to the third invention is the DC motor driving apparatus to drive a DC motor, which comprising: a first transistor which is inserted into a current path to supply the current from a DC power supply to the DC motor, and controlled to be turned ON/OFF; a second transistor connected between a pair of terminals of the DC motor; and a calculation processing unit which is operated according to a program, and turns ON the second transistor for a predetermined period of time while the first transistor is turned OFF.

In the DC motor driving apparatus according to the present invention, when the first transistor is ON/OFF controlled, the current is supplied from the DC power supply to the DC motor. When the ON time of the first transistor is controlled in a predetermined period, the current supplied to the DC motor is controlled, and the rotation speed of the DC motor can be controlled.

In the OFF period of the first transistor, the counter electromotive force is generated in the DC motor. In this case, because the calculation processing unit is operated according to the program so that, within the OFF period of the first transistor, the second transistor is turned ON for a predetermined time period, when the counter electromotive force is generated in the DC motor, the second transistor can be turned ON. When the second transistor is turned ON, due to the counter electromotive force generated in the DC motor, the regenerative current flows to the second transistor, thereby, the counter electromotive force is eliminated. Because the drop voltage at the time when the second transistor is ON, is lower as compared to the forward voltage of the Schottky diode, the heat generation amount is smaller, and the heat loss is smaller.

In this case, by making the program so that the ON time of the second transistor is set corresponding to the ON time of the first transistor, the second transistor can be turned ON when the counter electromotive force is generated in the DC motor. Accordingly, it is prevented that, under the condition that the regenerative current does not flow, the short circuit is caused between terminals of the DC motor and the DC motor is braked.

Accordingly, the drive efficiency can be increased while size reduction of the DC motor driving apparatus is being intended.

(4) The Fourth Invention

A DC motor driving apparatus according to the fourth invention is the DC motor driving apparatus to positively rotate and reversely rotate the DC motor, which comprising: a first transistor which is connected between one potential side of the DC power supply and one terminal of the DC motor, and is turned ON at the time of a positive rotation; a second transistor which is connected between the one potential side of the DC power supply and the other terminal of the DC motor, and is turned ON at the time of a reversal rotation; a third transistor which is connected between the other potential side of the DC power supply and the one terminal of the DC motor, and is turned OFF at the time of the positive rotation, and ON/OFF controlled at the time of the reversal rotation; a fourth transistor which is connected between the other potential side of the DC power supply and the other terminal of the DC motor, and ON/OFF controlled at the time of the positive rotation, and turned OFF at the time of the reversal rotation; a first control circuit for comparing the potential of both terminals of the first transistor, and for turning ON the first transistor when the counter electromotive force is generated in the DC motor at the time of. the reversal rotation; and a second control circuit for comparing the potential of both terminals of the second transistor, and for turning ON the second transistor when the counter electromotive force is generated in the DC motor at the time of the positive rotation.

In the DC motor driving apparatus according to the present invention, when the DC motor is positively rotated, the first transistor is turned ON, the third transistor is turned OFF, and the fourth transistor is ON/OFF controlled. Thereby, the current flows from one potential side of the DC power supply to the other potential side of the DC power supply through the first transistor, one terminal, DC motor, the other terminal, and the fourth transistor, and the DC motor is positively rotated. By controlling the ON time of the fourth transistor in a predetermined period, the current supplied to the DC motor is controlled, and the rotation speed of the DC motor can be controlled.

In the OFF period of the fourth transistor, the counter electromotive force is generated in the DC motor. By the second control means, the potential of both ends of the second transistor is compared, and it is detected whether the counter electromotive force is generated in the DC motor, or not, and when the counter electromotive force is generated in the DC motor, the second transistor can be turned ON. When the second transistor is turned ON, the both terminals of the DC motor is short circuited through the first transistor and the second transistor, and due to the counter electromotive force generated in the DC motor, the regenerative current flows from the other terminal of the DC motor to the one terminal through the second transistor and the first transistor, and the counter electromotive force is eliminated. Because the drop voltage when the first and the second transistors are turned ON, is very low as compared to the forward voltage of the Schottky diode, the heat generation amount is small, and the heat loss is small.

In this case, the ON time of the second transistor is controlled at real time so that the second transistor is turned ON only when the counter electromotive force is generated in the DC motor, corresponding to the ON time of the fourth transistor. Accordingly, it is prevented that the short circuit is caused between terminals of the DC motor, and the DC motor is braked, under the condition that the regenerative current does not flow.

When the DC motor is reversely rotated, the second transistor is turned ON, the third transistor is ON/OFF controlled, and the fourth transistor is turned OFF. Thereby, the current flows from one potential side of the DC power supply through the second transistor, the other terminal, DC motor, one terminal and the third transistor, and the DC motor is reversely rotated. By controlling the ON time of the third transistor in a predetermined period, the current supplied to the DC motor is controlled, and the rotation speed of the DC motor can be controlled.

In the OFF period of the third transistor, the counter electromotive force is generated in the DC motor. By the first control means, the potential of both ends of the first transistor is compared, and it is detected whether the counter electromotive force is generated in the DC motor, or not, and when the counter electromotive force is generated in the DC motor, the first transistor can be turned ON. When the first transistor is turned ON, the both terminals of the DC motor is short circuited through the first transistor and the second transistor, and due to the counter electromotive force generated in the DC motor, the regenerative current flows from the other terminal of the DC motor to the one terminal through the first transistor and the second transistor, and the counter electromotive force is eliminated. Because the drop voltage when the first and the second transistors are turned ON, is low as compared to the forward voltage of the Schottky diode, the heat generation amount is small, and the heat loss is small.

In this case, the ON time of the first transistor is controlled at real time so that the first transistor is turned ON only when the counter electromotive force is generated in the DC motor, corresponding to the ON time of the third transistor. Accordingly, it is prevented that the short circuit is caused between terminals of the DC motor, and the DC motor is braked, under the condition that the regenerative current does not flow.

Accordingly, the drive efficiency can be increased while size reduction of the DC motor driving apparatus is being intended.

(5) The Fifth Invention

A DC motor driving apparatus according to the fifth invention is the DC motor driving apparatus according to the fourth invention, wherein a first control circuit includes: a first comparator which compares the potential of both ends of the first transistor, and at the time of reversal rotation, detects that the counter electromotive force is generated in the DC motor, and outputs the first detection signal; and a first control signal generation circuit to generate the first control signal to turn ON the first transistor corresponding to the first detection signal outputted from the first comparator, and a second control circuit includes: a second comparator which compares the potential of both ends of the second transistor, and at the time of positive rotation, detects that the counter electromotive force is generated in the DC motor, and outputs the second detection signal; and a second control signal generation circuit to generate the second control signal to turn ON the second transistor corresponding to the second detection signal outputted from the second comparator.

In this case, the potential of both ends of the first transistor are compared by the first comparator, and it is detected that the counter electromotive force is generated in the DC motor at the time of the reversal rotation, and the first detection signal is outputted. The first control signal to turn ON the first transistor is generated by the first control signal generating circuit corresponding to the first detection signal. Further, the potential of both ends of the second transistor are compared by the second comparator, and it is detected that the counter electromotive force is generated in the DC motor at the time of the positive rotation, and the second detection signal is outputted. The second control signal to turn ON the second transistor is generated by the second control signal generating circuit corresponding to the second detection signal.

(6) The Sixth Invention

A DC motor driving apparatus according to the sixth invention is the DC motor driving apparatus to positively rotate and reversely rotate a DC motor, which comprising: a first transistor which is connected between one potential side of the DC power supply and one terminal of the DC motor, and is turned ON at the time of a positive rotation; a second transistor which is connected between the one potential side of the DC power supply and the other terminal of the DC motor, and is turned ON at the time of a reversal rotation; a third transistor which is connected between the other potential side of the DC power supply and the one terminal of the DC motor, and is turned OFF at the time of the positive rotation, and ON/OFF controlled at the time of the reversal rotation; a fourth transistor which is connected between the other potential side of the DC power supply and the other terminal of the DC motor, and ON/OFF controlled at the time of the positive rotation, and turned OFF at the time of the reversal rotation; and a calculation processing unit which is operated according to a program, and turns ON the first transistor for a predetermined period of time in a period in which the third transistor is turned OFF at the time of the reversal rotation, and turns ON the second transistor for a predetermined period of time in a period in which the fourth transistor is turned OFF at the time of the positive rotation.

In the DC motor driving apparatus according to the present invention, when the DC motor is positively rotated, the first transistor is turned ON, the third transistor is turned OFF, and the fourth transistor is ON/OFF controlled. Thereby, the current flows from one potential side of the DC power supply to the other potential side of the DC power supply through the first transistor, one terminal, DC motor, the other terminal, and the fourth transistor, and the DC motor is positively rotated. By controlling the ON time of the fourth transistor in a predetermined period, the current supplied to the DC motor is controlled, and the rotation speed of the DC motor can be controlled.

In the OFF period of the fourth transistor, the counter electromotive force is generated in the DC motor. In this case, because the calculation processing unit is operated according to the program so that the second transistor is turned ON for a predetermined time period in the period in which the fourth transistor is turned OFF, when the counter electromotive force is generated in the DC motor, the second transistor can be turned ON. When the second transistor is turned ON, the both terminals of the DC motor is short circuited through the first transistor and the second transistor, and due to the counter electromotive force generated in the DC motor, the regenerative current flows from the other terminal of the DC motor to the one terminal through the second transistor and the first transistor, and the counter electromotive force is eliminated. Because the drop voltage when the first and the second transistors are turned ON, is low as compared to the forward voltage of the Schottky diode, the heat generation amount is small, and the heat loss is small.

In this case, by making the program so that the ON time of the second transistor is set corresponding to the ON time of the fourth transistor, the second transistor can be turned ON only when the counter electromotive force is generated in the DC motor. Accordingly, it is prevented that the short circuit is caused between terminals of the DC motor and the DC motor is braked, under the condition that the regenerative current does not flow.

When the DC motor is reversely rotated, the second transistor is turned ON, the third transistor is ON/OFF controlled, and the fourth transistor is turned OFF. Thereby, the current flows from one potential side of the DC power supply through the second transistor, the other terminal, DC motor, one terminal and the third transistor, and the DC motor is reversely rotated. By controlling the ON time of the third transistor in a predetermined period, the current supplied to the DC motor is controlled, and the rotation speed of the DC motor can be controlled.

In the OFF period of the third transistor, the counter electromotive force is generated in the DC motor. In this case, because the calculation processing unit is operated according to the program so that the first transistor is turned ON for a predetermined time period in the period in which the third transistor is turned OFF, when the counter electromotive force is generated in the DC motor, the first transistor can be turned ON. When the first transistor is turned ON, the both terminals of the DC motor is short circuited through the first transistor and the second transistor, and due to the counter electromotive force generated in the DC motor, the regenerative current flows from the one terminal of the DC motor to the other terminal through the first transistor and the second transistor, and the counter electromotive force is eliminated. Because the drop voltage when the first and the second transistors are turned ON, is low as compared to the forward voltage of the Schottky diode, the heat generation amount is small, and the heat loss is small.

In this case, by making the program so that the ON time of the first transistor is set corresponding to the ON time of the third transistor, the first transistor can be turned ON when the counter electromotive force is generated in the DC motor. Accordingly, it is prevented that the short circuit is caused between terminals of the DC motor, and the DC motor is braked, under the condition that the regenerative current does not flow.

Accordingly, the drive efficiency can be increased while size reduction of the DC motor driving apparatus is being intended.

(7) The Seventh Invention

A DC motor driving apparatus according to the seventh invention is the DC motor driving apparatus to drive a DC motor, which comprising: a first switching means which is inserted into a current path to supply the current from a DC power supply to the DC motor, and ON/OFF controlled; a second switching means which is connected between a pair of terminals of the DC motor; and a control means for comparing the potential of both ends of the second switching means, and for turning ON the second switching means when the counter electromotive force is generated in the DC motor.

In the DC motor driving apparatus according to the present invention, when the first switching means is ON/OFF controlled, the current is supplied from the DC power supply to the DC motor. When the ON time of the first switching means is controlled within a predetermined period, the current supplied to the DC motor is controlled, and the rotation speed of the DC motor can be controlled.

During the OFF period of the first switching means, the counter electromotive force is generated in the DC motor. In this case, by comparing the potential of both ends of the second switching means by the control means, it is detected whether the counter electromotive force is generated in the DC motor, and when the counter electromotive force is generated in the DC motor, the second switching means can be turned ON. When the second switching means is turned ON, the regenerative current flows to the second switching means by the counter electromotive force generated in the DC motor, and the counter electromotive force is deleted. Because the drop voltage in the ON time of the second switching means is not higher than the forward voltage of the Schottky diode, the heat generation amount is small, and the heat loss is small.

In this case, the ON time of the second switching means is controlled at. real time so that the second switching means is turned ON only when the counter electromotive force is generated in the DC motor. Accordingly, it is prevented that both terminals of the DC motor are short circuited and the DC motor is braked, under the condition that regenerative current does not flow.

Accordingly, the drive efficiency can be increased while the size reduction of the DC motor driving apparatus is being intended.

(8) The eighth invention

A DC motor driving apparatus according to the eighth invention is the DC motor driving apparatus according to the seventh invention, wherein the control means includes: a counter electromotive force detection means for comparing the potential of both ends of the second switching means, and detecting that the counter electromotive force is generated in the DC motor; and a switching control means for turning ON the second switching means corresponding to the detection of the counter electromotive force by the counter electromotive force detection means.

In this case, the potential of both ends of the second switching means are compared by the counter electromotive force detection means, and it is detected that the counter electromotive force is generated in the DC motor. The second switching means is turned ON by the switching control means corresponding to the detection of the counter electromotive force by the counter electromotive force detection means.

(9) The Ninth Invention

A DC motor driving apparatus according to the ninth invention is the DC motor driving apparatus to drive a DC motor, which comprising: a first switching means which is inserted into a current path to supply the current from a DC power supply to the DC motor, and ON/OFF controlled; a second switching means which is connected between a pair of terminals of the DC motor; and a calculation processing means for operating according to a program, and for turning ON the second switching means for a predetermined time while the first switching means is turned OFF.

In the DC motor driving apparatus according to the present invention, when the first switching means is ON/OFF controlled, the current is supplied from the DC power supply to the DC motor. By controlling the ON time of the first switching means within a predetermined period, the current supplied to the DC motor can be controlled, and the rotation speed of the DC motor can be controlled.

Within the OFF period of the first switching means, the counter electromotive force is generated in the DC motor. In this case, because the calculation processing means is operated according to the program so that the second switching means is turned ON for a predetermined time within a period in which the first switching means is turned OFF, the second switching means can be turned ON when the counter electromotive force is generated in the DC motor. When the second switching means is turned ON, by the counter electromotive force generated in the DC motor, the regenerative current flows to the second switching means, and the counter electromotive force is deleted. Because the drop voltage in the ON time of the second switching means is not higher than the forward voltage of the Schottky diode, the heat generation amount is small, and the heat loss is small.

In this case, when the program is made so that the ON time of the second switching means is set corresponding to the ON time of the first switching means, the second switching means can be turned ON when the counter elec-
tromotive force is generated in the DC motor. Accordingly, it is prevented that both terminals of the DC motor are short circuited and the DC motor is braked, under the condition that the regenerative current does not flow.

Accordingly, the drive efficiency can be increased while the size reduction of the DC motor driving apparatus is being intended.

(10) The Tenth Invention

A DC motor driving apparatus according to the tenth invention is the DC motor driving apparatus to positively rotate and reversely rotate the DC motor, which comprising: the first switching means which is connected between one potential side of the DC power supply and one terminal of the DC motor, and turned ON at the time of the positive rotation; the second switching means which is connected between one potential side of the DC power supply and the other terminal of the DC motor, and turned ON at the time of the reversal rotation; the third switching means which is connected between the other potential side of the DC power supply and one terminal of the DC motor, and turned ON at the time of the positive rotation, and ON/OFF controlled at the time of the reversal rotation; the fourth switching means which is connected between the other potential side of the DC power supply and the other terminal of the DC motor, and turned ON at the time of the positive rotation, and turned OFF at the time of the reversal rotation; the first control means for comparing the potential of both ends of the first switching means, and for turning ON the first switching means when the counter electromotive force is generated in the DC motor, at the time of the reversal rotation; and the second control means for comparing the potential of both ends of the second switching means, and for turning ON the second switching means when the counter electromotive force is generated in the DC motor, at the time of the positive rotation.

In the DC motor driving apparatus according to the present invention, at the positive rotation of the DC motor, the first switching means is turned ON, the third switching means is turned OFF, and the forth switching means is ON/OFF controlled. Thereby, the current flows from the one potential side of the DC power supply to the other potential side of the DC power supply, through the first switching means, one terminal, DC motor, the other terminal and the fourth switching means, and the DC motor is positively rotated. By controlling the ON time of the fourth switching means within a predetermined period, the current supplied to the DC motor is controlled, and the rotation speed of the DC motor can be controlled.

During the OFF period of the fourth switching means, the counter electromotive force is generated in the DC motor. By comparing the potential of both ends of the second switching means by the second control means, it is detected whether the counter electromotive force is generated in the DC motor, and when the counter electromotive force is generated in the DC motor, the second switching means can be turned ON. When the second switching means is turned ON, both terminals of the DC motor are short circuited through the first switching means and the second switching means, and the regenerative current flows from the other terminal of the DC motor to the one terminal through the second switching means and the first switching means, by the counter electromotive force generated in the DC motor, and the counter electromotive force is deleted. Because the drop voltage in the ON time of the first and second switching means is very lower than the forward voltage of the Schottky diode, the heat generation amount is small, and the heat loss is small.

In this case, the ON time of the second switching means is controlled at real time so that the second switching means is turned ON only when the counter electromotive force is generated in the DC motor, corresponding to ON time of the forth switching means. Accordingly, it is prevented that both terminals of the DC motor are short circuited and the DC motor is braked, under the condition that regenerative current does not flow.

At the time of the reversal rotation of the DC motor, the second switching means is turned ON, the third switching means is ON/OFF controlled, and the fourth switching means is tuned OFF. Thereby, the current flows from the one potential side of the DC power supply through the second switching means, the other terminal, DC motor, one terminal, and the third switching means, and the DC motor is reversely rotated. By controlling the ON time of the third switching means in a predetermined period, the current supplied to the DC motor is controlled, and the rotation speed of the DC motor can be controlled.

During the OFF period of the third switching means, the counter electromotive force is generated in the DC motor. By comparing the potential of both ends of the first switching means by the first control means, it is detected whether the counter electromotive force is generated in the DC motor, and when the counter electromotive force is generated in the DC motor, the first switching means can be turned ON. When the first switching means is turned ON, both terminals of the DC motor are short circuited through the first switching means and the second switching means, and the regenerative current flows from the one terminal of the DC motor to the other terminal through the first switching means and the second switching means, by the counter electromotive force generated in the DC motor, and the counter electromotive force is deleted. Because the drop voltage in the ON time of the first and second switching means is lower than the forward voltage of the Schottky diode, the heat generation amount is small, and the heat loss is small.

In this case, the ON time of the first switching means is controlled at real time so that the first switching means is turned ON only when the counter electromotive force is generated in the DC motor, corresponding to ON time of the third switching means. Accordingly, it is prevented that both terminals of the DC motor are short circuited and the DC motor is braked, under the condition that regenerative current does not flow.

Accordingly, the drive efficiency can be increased while the size reduction of the DC motor driving apparatus is being intended

(11) The eleventh invention

A DC motor driving apparatus according to the eleventh invention is the DC motor driving apparatus according to the tenth invention, wherein the first control means includes: the first counter electromotive force detection means for comparing the potential of both ends of the first switching means, and detecting that the counter electromotive force is generated in the DC motor at the time of the reversal rotation; and the first switching control means for turning ON the first switching means corresponding to the detection of the counter electromotive force by the first counter electromotive force detection means, and the second control means includes: the second counter electromotive force detection means for comparing the potential of both ends of the second switching means, and detecting that the counter electromotive force is generated in the DC motor, at the time of the positive rotation; and the second switching control means for turning ON the second switching means corresponding to the detection of the counter electromotive force by the second counter electromotive force detection means.

In the DC motor driving apparatus according to the present invention, the potential of both ends of the first switching means are compared by the first counter electromotive force detection means, and it is detected that the counter electromotive force is generated in the DC motor at the time of the reversal rotation. The first switching means is turned ON by the first switching control means corresponding to the detection of the counter electromotive force by the first counter electromotive force detection means. Further, the potential of both ends of the second switching means are compared by the second counter electromotive force detection means, and it is detected that the counter electromotive force is generated in the DC motor at the time of the positive rotation. The second switching means is turned ON by the second switching control means corresponding to the detection of the counter electromotive force by the second counter electromotive force detection means.

(12) Twelfth Invention

A DC motor driving apparatus according to the twelfth invention is the DC motor driving apparatus to positively rotate and reversely rotate the DC motor, which comprising: the first switching means which is connected between one potential side of the DC power supply and one terminal of the DC motor, and turned ON at the time of the positive rotation; the second switching means which is connected between one potential side of the DC power supply and the other terminal of the DC motor, and turned ON at the time of the reversal rotation; the third switching means which is connected between the other potential side of the DC power supply and one terminal of the DC motor, and turned OFF at the time of the positive rotation, and ON/OFF controlled at the time of the reversal rotation; the fourth switching means which is connected between the other potential side of the DC power supply and the other terminal of the DC motor, and ON/OFF controlled at the time of the positive rotation, and turned OFF at the time of the reversal rotation; and a calculation processing means for operating according to a program, and for turning ON the first switching means for a predetermined time while the third switching means is turned OFF at the time of the reversal rotation, and for turning ON the second switching means for a predetermined time while the fourth switching means is turned OFF at the time of the positive rotation.

In the DC motor driving apparatus according to the present invention, at the time of the positive rotation of the DC motor, the first switching means is turned ON, the third switching means ids turned OFF, and the fourth switching means is ON/OFF controlled. Thereby, the current flows from the one potential side of the DC power supply to the other potential side of the DC power supply through the first switching means, one terminal, DC motor, the other terminal and the fourth switching means, and the DC motor is positively rotated By controlling the ON time of the fourth switching means in a predetermined period, the current supplied to the DC motor is controlled, and the rotation speed of the DC motor can be controlled During the OFF period of the fourth switching means, the counter electromotive force is generated in the DC motor. In this case, because the calculation processing means is operated according to the program so that the second switching means is turned ON for a predetermined time during the period in which the fourth switching means is turned OFF, the second switching means can be turned ON when the counter electromotive force is generated in the DC motor. When the second switching means is turned. ON, both terminals of the DC motor are short circuited through the first switching means and the second switching means, and the regenerative current flows from the other terminal to the one terminal through the second switching means and the first switching means by the counter electromotive force generated in the DC motor, and the counter electromotive force is deleted. Because the drop voltage in the ON time of the first and second switching means is lower than the forward voltage of the Schottky diode, the heat generation amount is small, and the heat loss is small.

In this case, when the program is made so that the ON time of the second switching means is set corresponding to the ON time of the fourth switching means, the second switching means can be turned ON only when the counter electromotive force is generated in the DC motor. Accordingly, it is prevented that both terminal of the DC motor are short circuited and the DC motor is braked, under the condition that the regenerative current does not flow.

At the time of the reversal rotation of the DC motor, the second switching means is turned ON, the third switching means is ON/OFF controlled, and the fourth switching means is tuned OFF. Thereby, the current flows from the one potential side of the DC power supply through the second switching means, the other terminal, DC motor, one terminal, and the third switching means, and the DC motor is reversely rotated. By controlling the ON time of the third switching means in a predetermined period, the current supplied to the DC motor is controlled, and the rotation speed of the DC motor can be controlled.

During the OFF period of the third switching means, the counter electromotive force is generated in the DC motor. By comparing the potential of both ends of the first switching means by the first control means, it is detected whether the counter electromotive force is generated in the DC motor, and when the counter electromotive force is generated in the DC motor, the first switching means can be turned ON. When the first switching means is turned ON, both terminals of the DC motor are short circuited through the first switching means and the second switching means, and the regenerative current flows from the one terminal of the DC motor to the other terminal through the first switching means and the second switching means, by the counter electromotive force generated in the DC motor, and the counter electromotive force is deleted. Because the drop voltage in the ON time of the first and second switching means is lower than the forward voltage of the Schottky diode, the heat generation amount is small, and the heat loss is small.

In this case, when the program is made so that the ON time of the first switching means is set corresponding to the ON time of the third switching means, the first switching means can be turned ON when the counter electromotive force is generated in the DC motor. Accordingly, it is prevented that both terminals of the DC motor are short circuited and the DC motor is braked, under the condition that regenerative current does not flow.

Accordingly, the drive efficiency can be increased while the size reduction of the DC motor driving apparatus is being intended.

(13) The Thirteenth Invention

A DC motor driving apparatus according to the thirteenth invention is the DC motor driving apparatus according to the third, the sixth, the ninth, or the twelfth invention, wherein a predetermined time is the time previously determined to delete the counter electromotive force generated in the DC motor. Thereby, the counter electromotive force generated in the DC motor is completely deleted.

DETAILED DESCRIPTION OF THE PREFERRED EMBODIMENTS

Figure 1:
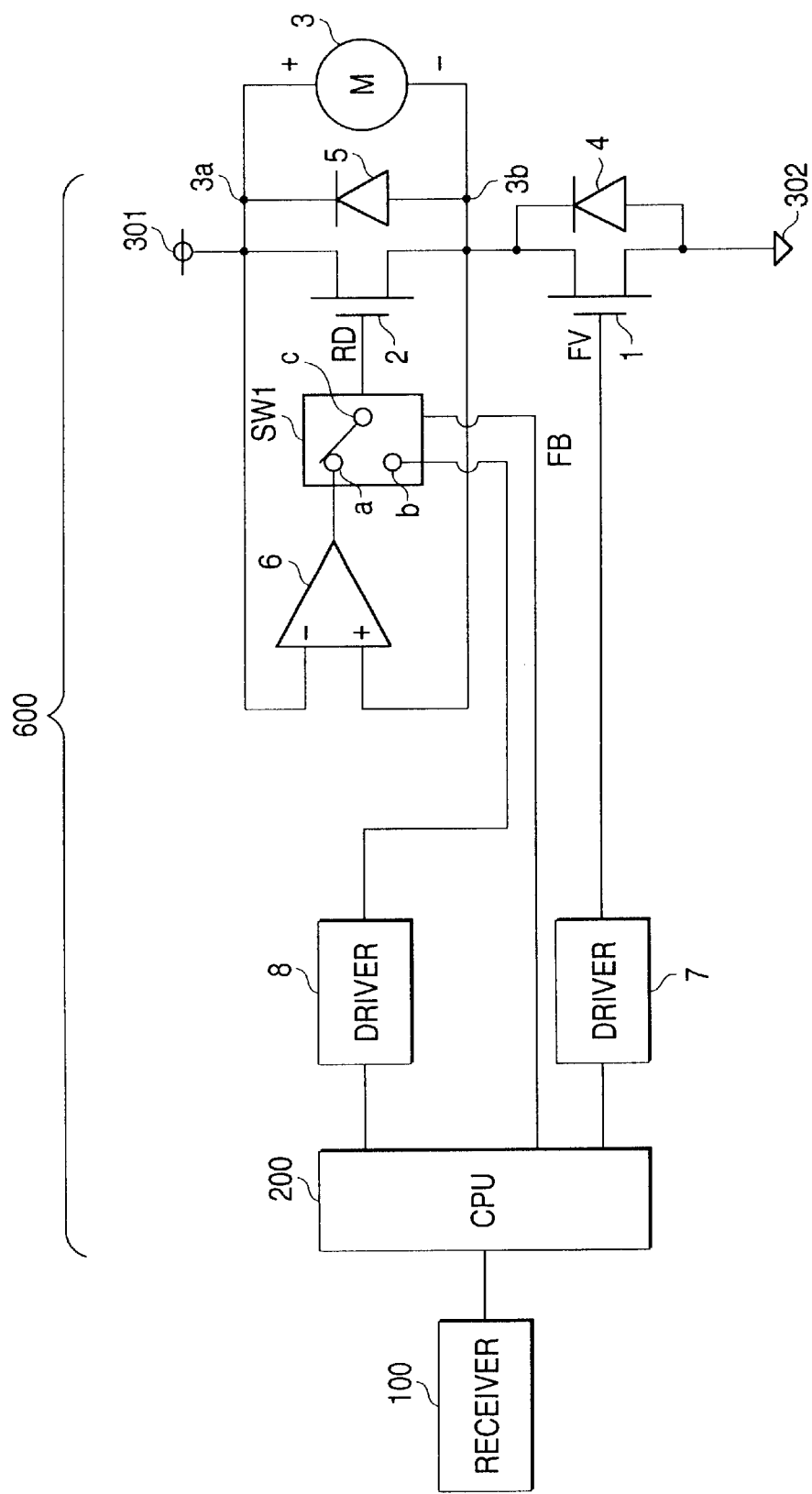
FIG. 1 is a circuit diagram of a DC motor driving apparatus in the first embodiment of the present invention.

FIG. 1 is a circuit diagram of a DC motor driving apparatus according to the first embodiment of the present invention. The DC motor driving apparatus in FIG. 1 is used for, for example, an electric radio control car.

In FIG. 1, a DC motor driving apparatus 600 includes FETs 1, 2, a comparator 6, drivers 7, 8 and a CPU 200. Drivers 7 and 8 are connected to the CPU 200.

The FET 1 is used for the speed control of a DC motor 3, and the FET 2 is used for the braking of the DC motor 3 and the elimination of the counter electromotive force, which will be described later. Body diodes 4 and 5 respectively exist inside the FETs 1 and 2. A power supply terminal 301 is connected to a positive electrode of a DC power supply (not shown), and a ground terminal 302 is connected to a negative electrode of the DC power supply. As the DC power supply, for example, a nickel-cadmium cell is used.

One terminal 3a of the DC motor 3 is connected to the power supply terminal 301, and the other terminal 3b of the DC motor 3 is connected to the ground terminal 302 through the FET 1. Further, FET 2 is connected between the one terminal 3a and the other terminal 3b of the DC motor 3.

A reversal input terminal of the comparator 6 is connected to the terminal 3a of the DC motor 3, and a non-reversal input terminal is connected to the terminal 3b of the DC motor 3. The output terminal of the comparator 6 is connected to a terminal a of a switch SW1. Further, the output terminal of the driver 7 is connected to a gate of the FET 1, and the output terminal of the driver 8 is connected to a terminal b of the switch SW1. Further, a terminal c of the switch SW1 is connected to a gate of the FET 2.

The CPU 200 is connected to a receiver 100. The receiver 100 receives the a signal transmitted from a remote controller, and sends a speed signal to the CPU 200. The CPU 200 supplies a control signal FV to the gate of the FET 1 through the driver 7, and a control signal to the terminal b of the switch SW1 through the driver 8, according to the speed signal sent from the receiver 100. From the terminal c of the switch SW1, a control signal RD is supplied to the gate of the FET 1.

The switch SW1 is switched by a switch signal FB supplied from the CPU 200. At the time of the positive rotation of the DC motor 3, the switch SW1 is switched to the terminal a side, and at the time of the braking of the DC motor 3, the switch SW1 is switched to the terminal b side. Incidentally, the switch signal FB can also be made from the output signal of the drivers 7 and 8.

In the present embodiment, the FET 1 corresponds to the first transistor and the first switching means, the FET 2 corresponds to the second transistor and the second switching means, and the comparator 6 corresponds to the control circuit and the control means.

Figure 2:
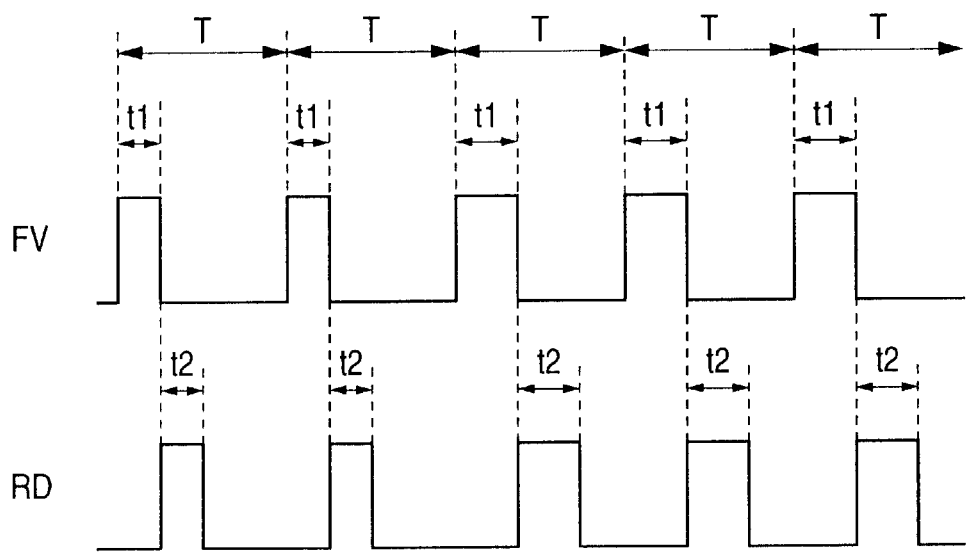
FIG. 2 is a view of a signal waveform showing the operation of the DC motor driving apparatus at the time of the positive rotation of the DC motor in FIG. 1.

FIG. 2 is a signal waveform view showing the operation of a DC motor driving apparatus 600 at the time of positive rotation of the DC motor 3 in FIG. 1.

At the time of positive rotation of the DC motor 3, the control signal FV change between the high level and the low level within a predetermined period T. In a period in which the control signal FV is high level, the FET 1 is turned ON. The current flows from the power supply terminal 301 to the ground terminal 302 through terminal 3a, DC motor 3, terminal 3b, and FET 1, and the DC motor is positively rotated. Within a predetermined period T, by controlling the ON time t1 of the FET 1, the current supplied to the DC motor is controlled, and the rotation speed of the DC motor 3 can be controlled. At this time, the control signal RD is the low level, and FET 2 is turned OFF.

When the control signal FV is turned to the low level, the FET 1 is tuned OFF. Thereby, the current is not supplied to the DC motor 3. In this case, the counter electromotive force is generated in the DC motor 3, the potential of the terminal 3b is higher than that of the terminal 3a. Accordingly, the control signal RD outputted from the comparator 6 is high level, and the FET 2 is tuned ON. As the result, the regenerative current flows from the terminal 3b to the terminal 3a through the FET 2, due to the counter electromotive force generated in the DC motor 3, and the counter electromotive force is eliminated.

When the potential of the terminal 3a of the DC motor 3 is equal to the potential of the terminal 3b, the control signal RD outputted from the comparator 6 becomes the low level. Thereby, the FET 2 is turned OFF.

In this case, the ON time t2 of the FET 2 is controlled at real time so that the FET 2 is turned ON only when the counter electromotive force is generated in the DC motor 3, corresponding to the ON time t1 of the FET 1. Accordingly, it is prevented that the short circuit is caused between terminals 3a and 3b of the DC motor 3 and the DC motor 3 is braked, under the condition that the regenerative current does not flow.

In the DC motor driving apparatus 600 of the present embodiment, because the drop voltage when the FET 2 is ON, is not larger than about 0.05 V and is smaller as compared to the forward voltage of about 0.4 V of the Schottky diode, the heat generation amount due to the voltage drop is very small. Thereby, the drive efficiency of the DC motor 3 is increased.

Specifically, when the DC motor driving apparatus 600 is used for the electric radio control car, the travel time is extended.

Further, because the temperature rise of the FETs 1 and 2 can be suppressed, the long period of time use under the high temperature becomes possible, and the damage due to the heat generation can also be avoided.

Further, because it is not necessary to connect the Schottky diode, the reduction of the size of the DC motor driving apparatus 600 can be attained.

Figure 3:
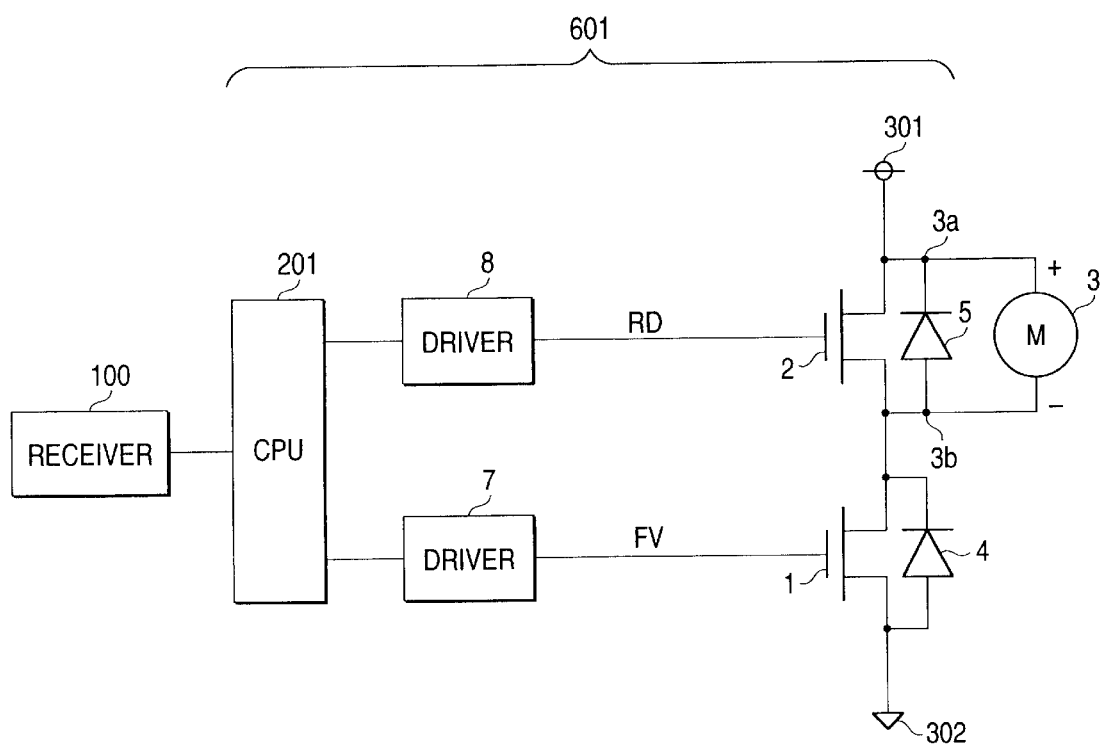
FIG. 3 is a circuit diagram of the DC motor driving apparatus in the second embodiment of the present invention.

FIG. 3 is a circuit diagram of a DC motor driving apparatus according to the second embodiment of the present invention. The DC motor driving apparatus in FIG. 3 is also used for, for example, the electric radio control car.

The different point of the DC motor driving apparatus 601 in FIG. 3 from the DC motor driving apparatus 600 in FIG. 1 is that the comparator 6 and the switch SW1 in FIG. 1 are not provided, and the operation of the CPU 201 is different from the operation of the CPU 200 in FIG. 1.

The CPU 201 in FIG. 3 generates the control signal FV and the control signal RD shown in FIG. 2 according to the program.

In the present embodiment, the FET 1 corresponds to the first transistor and the first switching means, the FET 2 corresponds to the second transistor and the second switching means, and the CPU 201 corresponds to the calculation processing unit and the calculation processing means.

Figure 4:
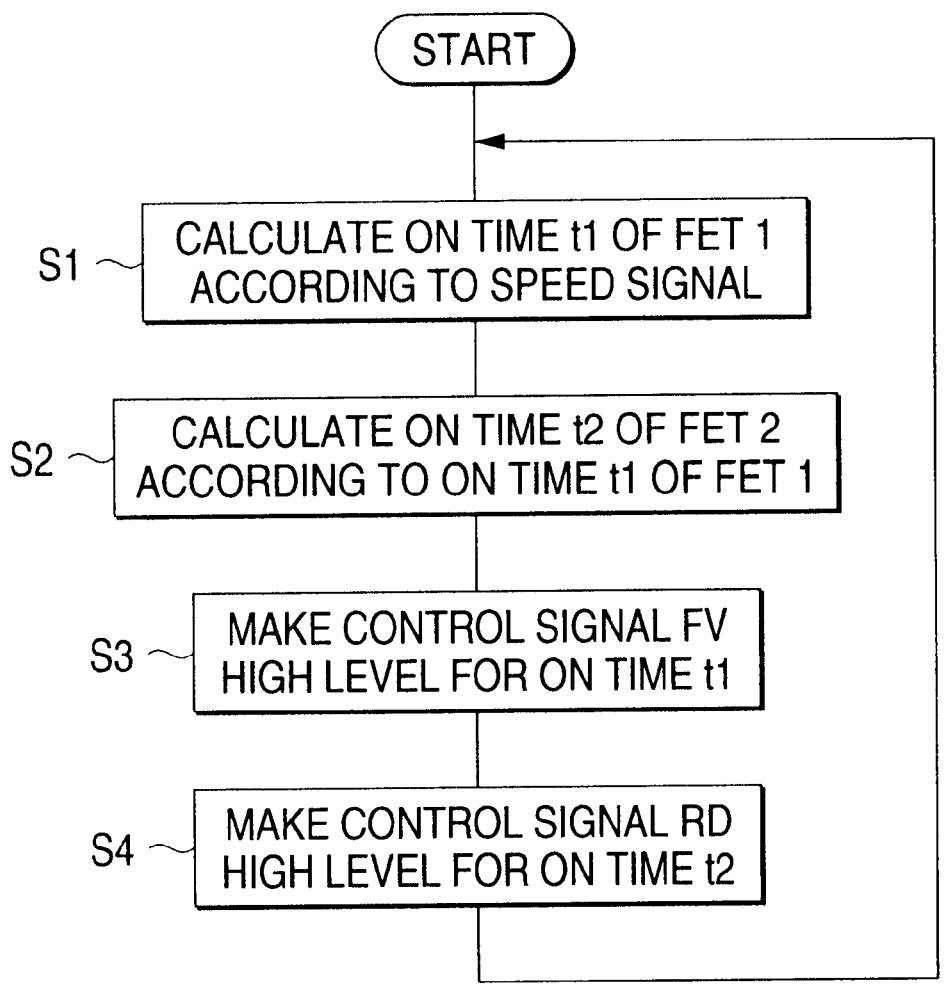
FIG. 4 is a flow chart showing the operation of a CPU of the DC motor driving apparatus in FIG. 3.

FIG. 4 is a flow chart showing the operation of the CPU 201 of the DC motor driving apparatus 601 in FIG. 3.

The CPU 201, initially, calculates the ON time t1 of the FET 1 according to the speed signal supplied from the receiver 100 (step S1). Next, The CPU 201 calculates the ON time t2 of the FET 2 according to the ON time t1 of the FET 1 (step S2).

Next, the CPU 201 makes the control signal FV high level for the ON time t1 (step 53). Thereby, the FET 1 is turned ON. As the result, the current flows from the power supply terminal 301 to the ground terminal 302 through the terminal 3a, DC motor 3, terminal 3b and FET 1, and the DC motor 3 is positively rotated.

When the control signal FV1 becomes the low level, the FET 1 is turned OFF. Thereby, the current does not flow to the DC motor 3. In this case, the counter electromotive force generates in the DC motor 3, and the potential of the terminal 3b is higher than the potential of the terminal 3a.

The CPU 201 makes the control signal RD high level for the ON time t2 (step S4). Thereby, the FET2 is turned ON. As the result, the regenerative current due to the counter electromotive force generated in the DC motor 3 flows from the terminal 3b to the terminal 3a through the FET 2, and the counter electromotive force is eliminated.

In this case, by making the program so that the ON time t2 of the FET 2 is set corresponding to the ON time t1 of the FET 1, the FET 2 can be turned ON when the counter electromotive force is generated in the DC motor 3. Accordingly, it is prevented that the short circuit is caused between terminals 3a and 3b of the DC motor 3 and the DC motor 3 is braked, under the condition that the regenerative current does not flow.

By repeatedly conducting the processing of the steps S1 to S4 at a predetermined period T, the speed control of the DC motor 3 at the time of the positive rotation can be conducted.

In the DC motor driving apparatus 601 of the present embodiment, because the drop voltage when the FET 2 is ON, is not larger than about 0.05 V and is smaller as compared to the forward voltage of about 0.4 V of the Schottky diode, the heat generation amount due to the voltage drop is very small. Thereby, the drive efficiency of the DC motor 3 is increased.

Specifically, when the DC motor driving apparatus 601 issued for the electric radio control car, the travel time is extended.

Further, because the temperature rise of the FETs 1 and 2 can be suppressed, the long period of time use under the high temperature becomes possible, and the damage due to the heat generation can also be avoided.

Further, because it is not necessary to connect the Schottky diode, the reduction of the size of the DC motor driving apparatus 601 can be attained.

Further, the control signal RD can be made by the program, and because it is not necessary to provide the comparator 6 and the switch SW1, the size of the DC motor driving apparatus 601 can be further reduced.

Figure 5:
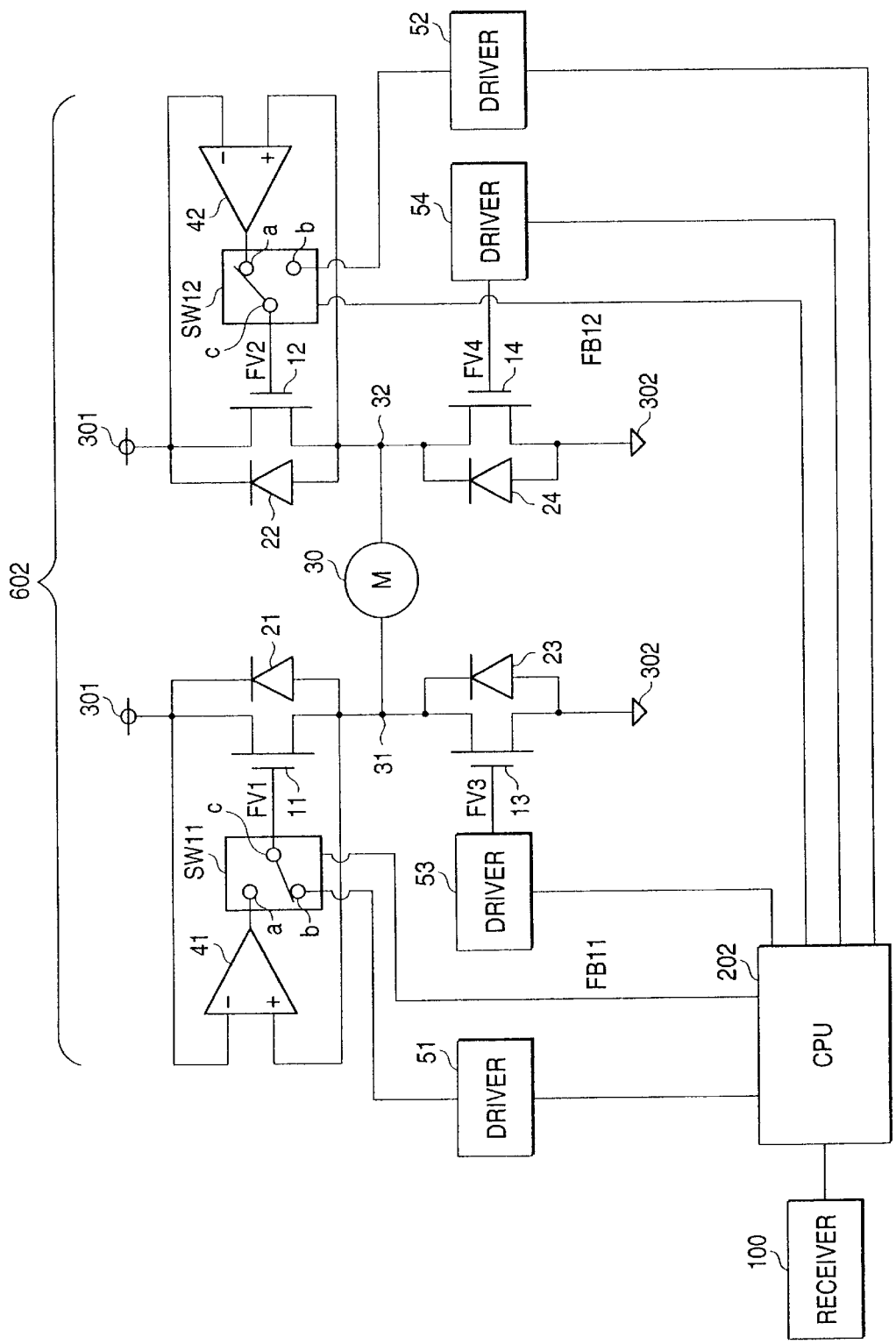
FIG. 5 is a circuit diagram of the DC motor driving apparatus in the third embodiment of the present invention.

FIG. 5 is a circuit diagram of a DC motor driving apparatus according to the third embodiment of the present invention. The DC motor driving apparatus in FIG. 5 is also used for, for example, the electric radio control car.

In FIG. 5, the DC motor driving apparatus 602 includes FETs 11, 12, 13, 14, comparators 41, 42, drivers 51, 52, 53, 54 and CPU 202.

One terminal 31 of the DC motor 30 is connected to the power supply terminal 301 through the FET 11, and to the ground terminal 302 through the FET 13. The other terminal 32 of the DC motor 30 is connected to the power supply terminal 301 through the FET 12, and to the ground terminal 302 through the. FET 14. Body diodes 21, 22, 23, and 24 respectively exist inside the FETs 11, 12, 13 and 14.

A reversal input terminal of the comparator 41 is connected to the power supply terminal 301, and a non-reversal input terminal of the comparator 41 is connected to the terminal 31 of the DC motor 30. The output terminal of the comparator 41 is connected to the terminal a of a switch SW11. Further, the reversal input terminal of the comparator 42 is connected to the power supply terminal 301, and the non-reversal input terminal of the comparator 42 is connected to the terminal 32 of the DC motor 30. The output terminal of the comparator 42 is connected to the terminal a of the switch SW12.

Drivers 51, 52, 53 and 54 are connected to the CPU 202. The output terminal of the driver 51 is connected to the terminal b of the switch SW11, the output terminal of the driver 52 is connected to the terminal b of the switch SW12, and the output terminal of the driver 53 is connected to the gate of the FET 13, and the output terminal of the driver 54 is connected to the gate of the FET 14. The terminal c of the switch SW11 is connected to the gate of the FET 11, and the terminal c of the switch SW12 is connected to the gate of the FET 12.

The CPU 202 is connected to the receiver 100. The receiver 100 receives the a signal transmitted from a remote controller, and sends the speed signal to the CPU 202. The CPU 202 supplies the control signal to the terminal b of the switch SW11 through the driver 51, the control signal to the terminal b of the switch SW12 through the driver 52, a control signal FV3 to the gate of the FET 13 through the driver 53, and a control signal FV4 to the gate of the FET 14 through the driver 54, according to the speed signal sent from the receiver 100. From the terminal c of the switch SW11, a control signal FV1 is supplied to the gate of the FET 11, and from the terminal c of the switch SW12, a control signal FV2 is supplied to the gate of the FET 12.

The switches SW11 and SW12 are respectively switched by switch signals FB11 and FB12 supplied from the CPU 202. At the time of the positive rotation of the DC motor 30, the switch SW11 is switched to the terminal b side, and the switch SW12 is switched to the terminal a side. At the time of the reversal rotation of the DC motor 30, the switch SW11 is switched to the terminal a side, and the switch SW12 is switched to the terminal b side. At the time of the braking of the DC motor 30, the switch SW11 is switched to the terminal b side, and the switch SW12 is switched to the terminal b side. Incidentally, the switch signals FB11 and FB12 can also be made from the output signal of the drivers 51 to 54.

In the present embodiment, the FET 11 corresponds to the first transistor and the first switching means, the FET 12 corresponds to the second transistor and the second switching means, the FET 13 corresponds to the third transistor and the third switching means, and the FET 14 corresponds to the fourth transistor and the fourth switching means. Further, the comparator 41 corresponds to the first control circuit and the first control means, and the comparator 42 corresponds to the second control circuit and the second control means.

Figure 6:
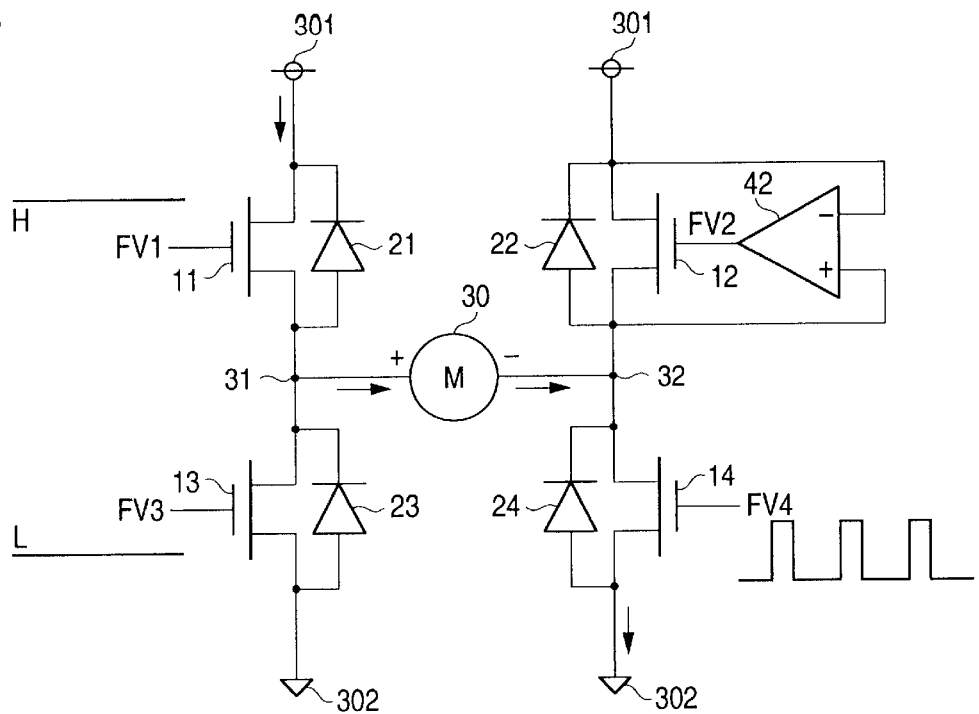
FIG. 6 is a circuit diagram showing the operation of the DC motor driving apparatus at the time of the positive rotation of the DC motor in FIG. 5.
Figure 7:
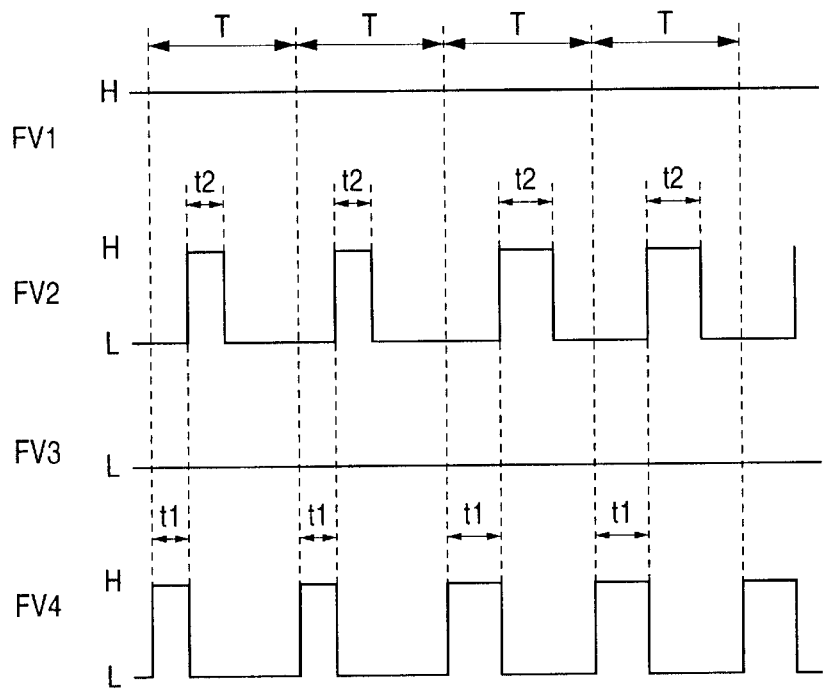
FIG. 7 is a view of a signal waveform showing the operation of the DC motor driving apparatus at the time of the positive rotation of the DC motor in FIG. 5.

FIG. 6 is a circuit diagram showing the operation of the DC motor driving apparatus 602 at the time of the positive rotation of the DC motor 30 in FIG. 5, and FIG. 7 is a view of signal waveform showing the operation of the DC motor driving apparatus 602 at the time of the positive rotation of the DC motor 30 in FIG. 5.

At the time of the positive rotation of the DC motor 30, the control signal FV1 is the high level, and the FET 11 is turned ON. Further, the control signal FV3 is the low level, and the FET 13 is turned OFF.

The control signal FV4 changes between the high level and the low level at a predetermined period T. At the period of the high level of the control signal FV4, the FET 14 is turned ON. According to that, as shown by an arrow, the current flows from the power supply 301 to the ground terminal 302 through the FET 11, terminal 31, DC motor 30, terminal 32 and the FET 14, and the DC motor 30 is positively rotated.

The ON time t1 of the FET 14 is determined according to the speed signal supplied from the receiver 100. By controlling the ON time t1 of the FET 14 in a predetermined period T, the current supplied to the DC motor 30 is controlled, and the rotation speed of the DC motor 30 can be controlled. At this time, the control signal FV2 is the low level, and the FET 12 is turned OFF.

When the control signal FV4 is the low level, the FET 14 is turned OFF. Thereby, the current does not flow to the DC motor 30. In this case, the counter electromotive force is generated in the DC motor 30, and the potential of the terminal 32 is higher than the potential of the terminal 31 and the power supply terminal 301. Accordingly, the control signal FV2 outputted from the comparator 42 is the high level, and the FET12 is turned ON. As the result, the regenerative current flows to the terminal 31 through the terminal 32, FET 12, the power supply terminal 301 and FET 11 due to the counter electromotive force generated in the DC motor 30, and the counter electromotive force is eliminated.

When the potential of the terminal 32 is equal to the potential of the terminal 31 and the power supply terminal 301, the control signal FV2 outputted from the comparator 42 is the low level. Thereby, the FET 12 is turned OFF.

The ON time t2 of the FET 12 is controlled at real time so that the FET 12 is turned ON only when the counter electromotive force is generated in the DC motor 30, corresponding to the ON time t1 of the FET 14. Accordingly, it is prevented that the short circuit is caused between terminals 31 and 32 of the DC motor 30, and the DC motor 30 is braked, under the condition that the regenerative current does not flow.

Figure 8:
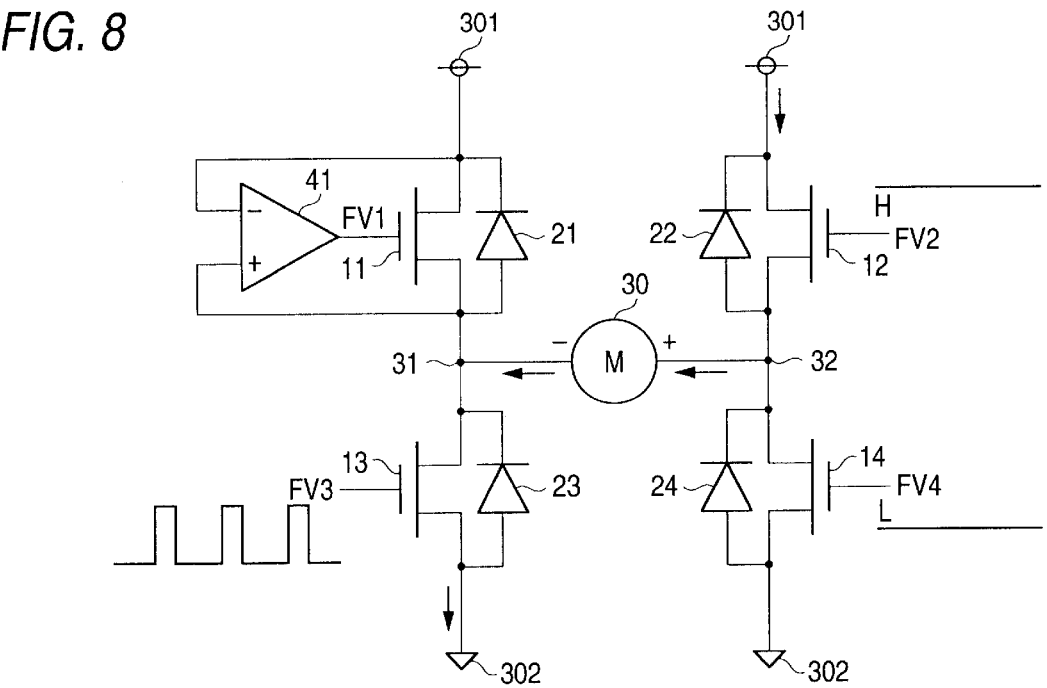
FIG. 8 is a circuit diagram showing the operation of the DC motor driving apparatus at the time of the reversal rotation of the DC motor in FIG. 5.
Figure 9:
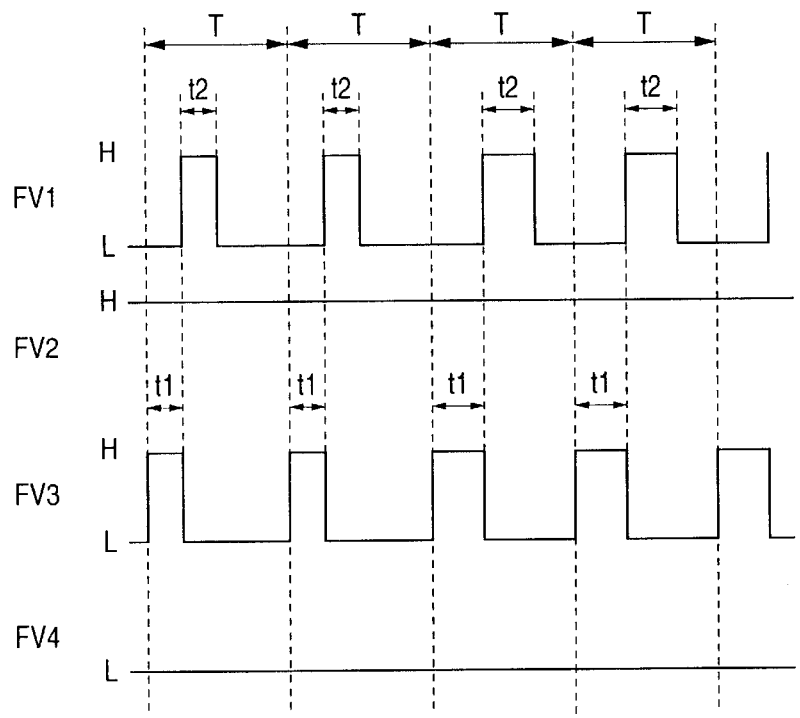
FIG. 9 is a view of a signal waveform showing the operation of the DC motor driving apparatus at the time of the reversal rotation of the DC motor in FIG. 5.

FIG. 8 is a circuit diagram showing the operation of the DC motor driving apparatus 602 at the time of the reversal rotation of the DC motor 30 in FIG. 5, and FIG. 9 is a view of the signal waveform showing the operation of the DC motor driving apparatus 602 at the time of the reversal rotation of the DC motor 30 in FIG. 5.

At the time of the reversal rotation of the DC motor 30, the control signal FV2 is the high level, and the FET 12 is turned ON. Further, the control signal FV4 is the low level, and the FET 14 is turned OFF.

The control signal FV3 changes between the high level and the low level at a predetermined period T. At the period of the high level of the control signal FV3, the FET 13 is turned ON. According to that, as shown by an arrow, the current flows from the power supply 301 to the ground terminal 302 through the FET 12, terminal 32, DC motor 30, terminal 31 and the FET 13, and the DC motor 30 is reversely rotated.

The ON time t1 of the FET 13 is determined according to the speed signal supplied from the receiver 100. By controlling the ON time t1 of the FET 13 in a predetermined period T, the current supplied to the DC motor 30 is controlled, and the rotation speed of the DC motor 30 can be controlled. At this time, the control signal FV1 is the low level, and the FET 11 is turned OFF.

When the control signal FV3 is the low level, the FET 13 is turned OFF. Thereby, the current does not flow to the DC motor 30. In this case, the counter electromotive force is generated in the DC motor 30, and the potential of the terminal 31 is higher than the potential of the terminal 32 and the power supply terminal 301. Accordingly, the control signal FV1 outputted from the comparator 41 is the high level, and the FET 11 is turned ON. As the result, the regenerative current flows to the terminal 32 through the terminal 31, FET 11, the power supply terminal 301 and FET 12 due to the counter electromotive force generated in the DC motor 30, and the counter electromotive force is eliminated.

When the potential of the terminal 31 is equal to the potential of the terminal 32 and the power supply terminal 301, the control signal FV1 outputted from the comparator 41 is the low level. Thereby, the FET 11 is turned OFF.

The ON time t2 of the FET 11 is controlled at real time so that the FET 11 is turned ON only when the counter electromotive force is generated in the DC motor 30, corresponding to the ON time t1 of the FET 13. Accordingly, it is prevented that both terminals 31 and 32 of the DC motor 30 are short circuited and the DC motor 30 is braked, under the condition that the regenerative current does not flow.

Figure 10:
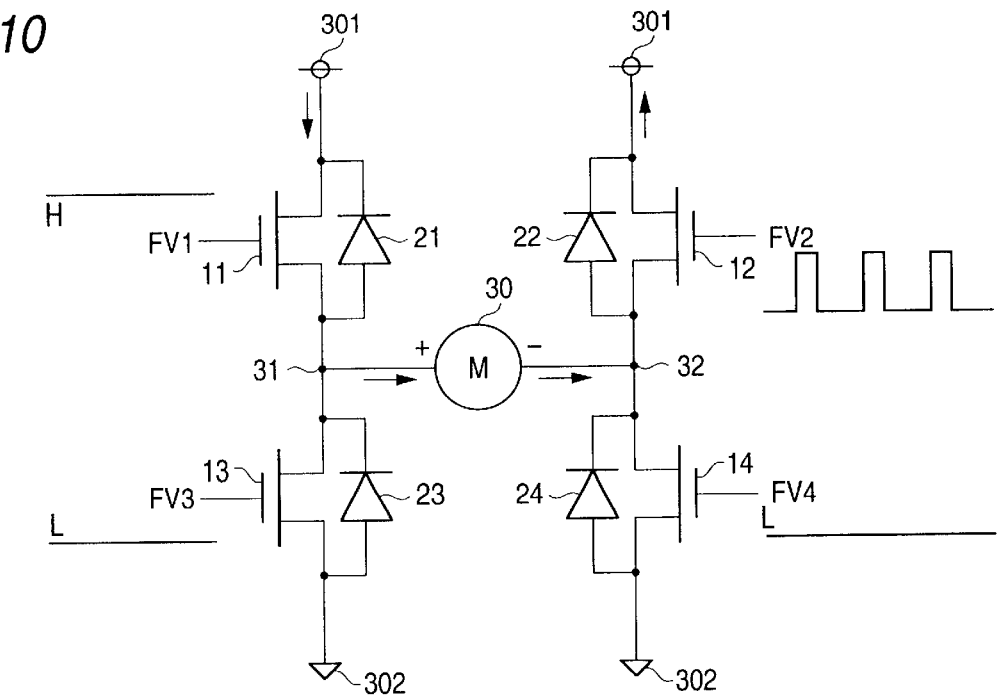
FIG. 10 is a circuit diagram showing the operation of the DC motor driving apparatus at the time of the braking of the DC motor in FIG. 5.
Figure 11:
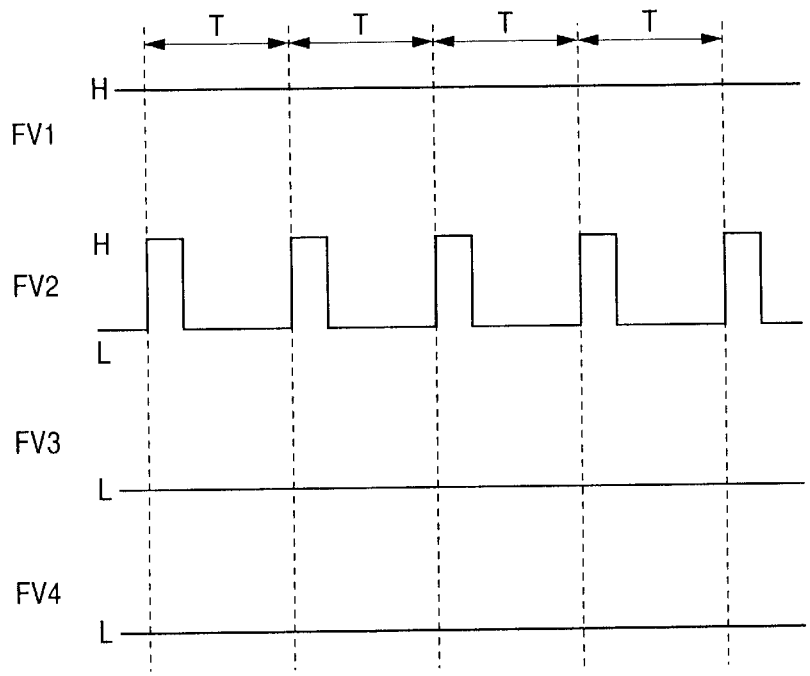
FIG. 11 is a view of a signal waveform showing the operation of the DC motor driving apparatus at the time of the braking of the DC motor in FIG. 5.

FIG. 10 is a circuit diagram showing the operation of the DC motor driving apparatus 602 at the time of the braking of the DC motor 30 in FIG. 5, and FIG. 11 is a view of the signal waveform showing the operation of the DC motor driving apparatus 602 at the time of the braking of the DC motor 30 in FIG. 5.

At the time of the braking of the DC motor 30, the control signal FV1 is the high level, and the FET 11 is turned ON. Further, the control signal FV3 and the control signal FV4 are the low level, and the FET 13 and the FET 14 are turned OFF.

The control signal FV2 changes between the high level and the low level in a predetermined period T. In the period of the high level of the control signal FV2, the FET 12 is turned ON, and the terminals 31 and 32 are short circuited through the FET 11, the power supply terminal 301, and FET 12. Further, in the period of the low level of the control signal FV2, the FET 12 is turned OFF, and the circuit between terminals 31 and 32 of the DC motor 30 is opened. By controlling the ON time of the FET 12 in a predetermined period T, the braked amount of the DC motor 30 can be controlled.

In the DC motor driving apparatus 602 of the present embodiment, because the drop voltage when the FETs 11, 12, 13 and 14 are ON, is not larger than about 0.05 V and is smaller as compared to the forward voltage of about 0.4 V of the Schottky diode, the heat generation amount due to the voltage drop is very small. Thereby, the drive efficiency of the DC motor 30 is increased.

Specifically, when the DC motor driving apparatus 602 is used for the electric radio control car, the travel time is extended.

Further, because the temperature rise of the FETs 11, 12, 13 and 14 can be suppressed, the long period of time use under the high temperature becomes possible, and the damage due to the heat generation can also be avoided.

Further, because it is not necessary to connect the Schottky diode, the reduction of the size of the DC motor driving apparatus 602 can be attained.

Figure 12:
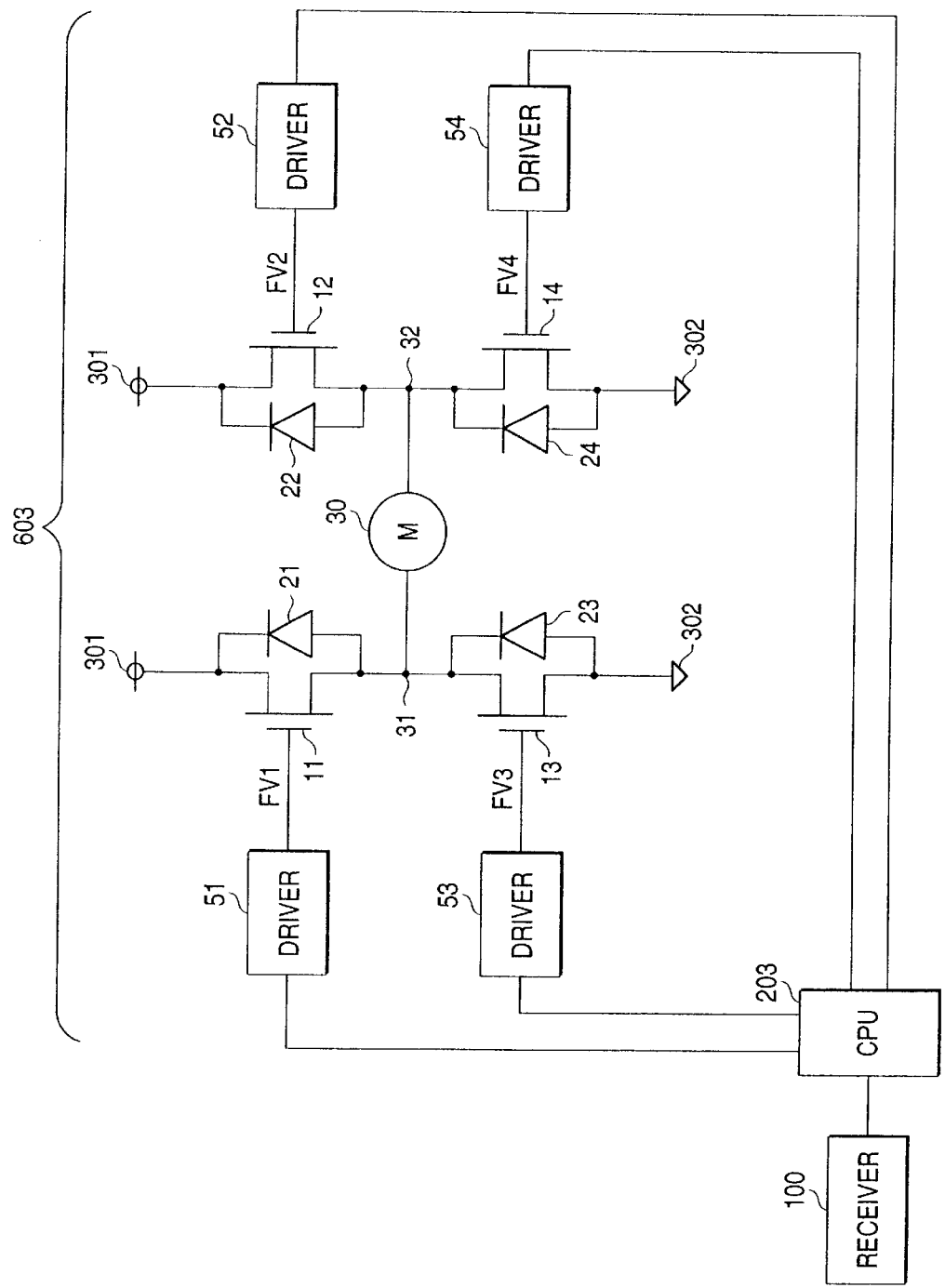
FIG. 12 is a circuit diagram of the DC motor driving apparatus in the fourth embodiment of the present invention.

FIG. 12 is a circuit diagram of a DC motor driving apparatus according to the fourth embodiment of the present invention. The DC motor driving apparatus in FIG. 12 is also used for, for example, the electric radio control car.

The different point of the DC motor driving apparatus 603 in FIG. 12 from the DC motor driving apparatus 602 in FIG. 5 is that the comparators 41, 42, and the switches SW11 and SW12 in FIG. 5 are not provided, and the operation of the CPU 203 is different from the operation of the CPU 202.

The CPU 203 in FIG. 12 generates the control signals FV1, Fv2, FV3 and FV4 shown in FIGS. 7, 9 and 11 according to the program.

In the present embodiment, the FET 11 corresponds to the first transistor and the first switching means, the FET 12 corresponds to the second transistor and the second switching means, the FET 13 corresponds to the third transistor and the third switching means, the FET 14 corresponds to the fourth transistor and the fourth switching means, and the CPU 203 corresponds to the calculation processing unit and the calculation processing means.

Figure 13:
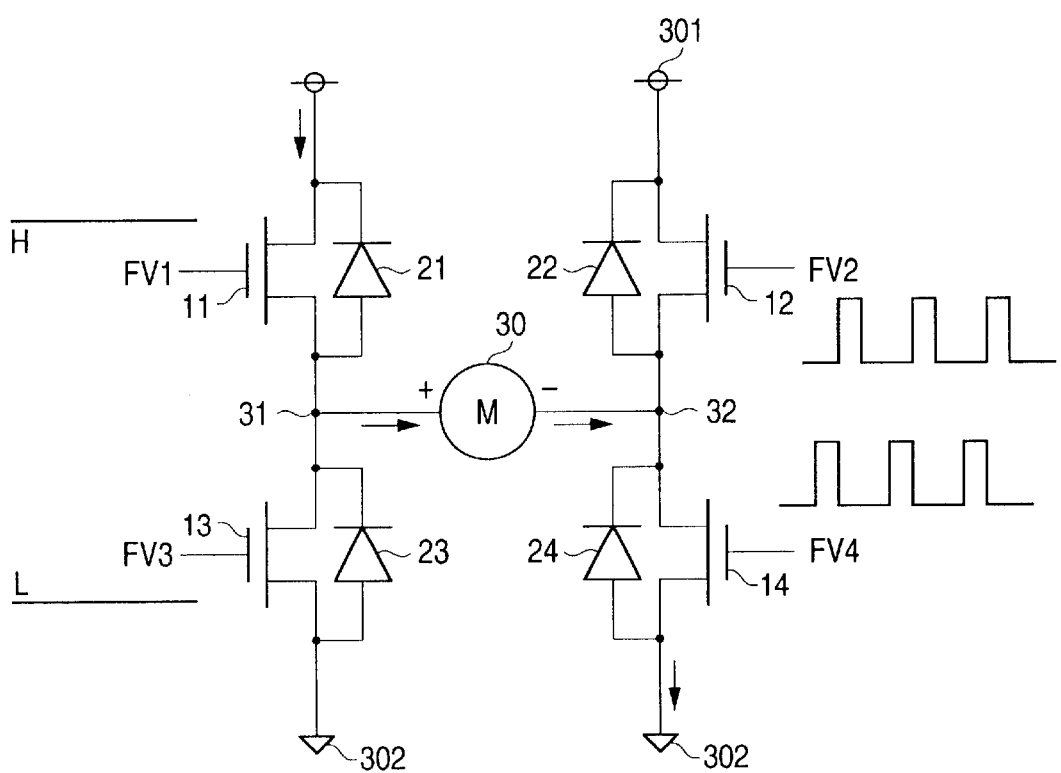
FIG. 13 is a circuit diagram showing the operation of the DC motor driving apparatus at the time of the positive rotation of the DC motor in FIG. 12.
Figure 14:
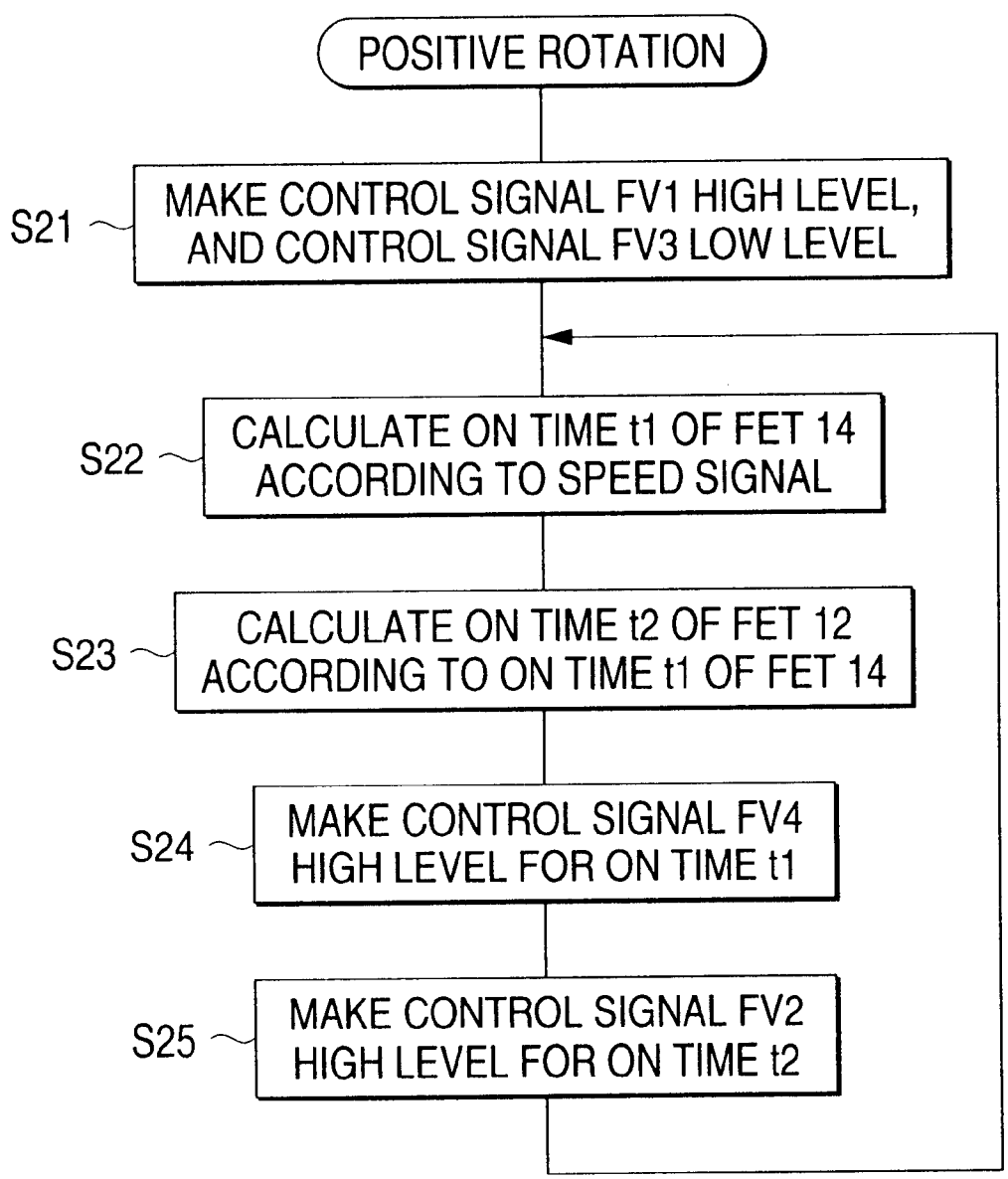
FIG. 14 is a flow chart showing the operation of the CPU of the DC motor driving apparatus at the time of the positive rotation of the DC motor in FIG. 12.

FIG. 13 is a circuit diagram showing the operation of the DC motor driving apparatus 603 at the time of the positive rotation of the DC motor 30 in FIG. 12, and FIG. 14 is a flow chart showing the operation of the CPU 203 at the time of positive rotation of the DC motor 30 in FIG. 12.

At the time of positive rotation of the DC motor 30, initially, the CPU 203 makes the control signal FV1 high level, and the control signal FV3 low level (step S21). According to that, the FET 11 is turned ON, and the FET 13 is turned OFF.

Next, the CPU 203 calculates the ON time t1 of the FET 14 according to the speed signal supplied from the receiver 100 (step S22). Further, the CPU 203 calculates the ON time t2 of the FET 12 according to the ON time ti of the FET 14 (step S23).

Next, the CPU 203 makes the control signal FV4 high level for the ON time t1 (step S24). Thereby, the FET 14 is turned ON. As the result, as shown by an arrow, the current flows from the power supply terminal 301 to the ground terminal 302 through the FET 11, terminal 31, DC motor 30, terminal 32 and the FET 14, and the DC motor 30 is positively rotated.

When the control signal FV4 is the low level, the FET 14 is turned OFF. Thereby, the current does not flow to the DC motor 30. In this case, the counter electromotive force is generated in the DC motor 30, and the potential of the terminal 32 is higher than the potential of the terminal 31 and the power supply terminal 301.

The CPU 203 makes the control signal FV2 high level for the ON time t2 (step S25). Thereby, the FET12 is turned ON. As the result, the regenerative current flows from the terminal 32 to the terminal 31 through the FET 12, the power supply terminal 301 and FET 11 due to the counter electromotive force generated in the DC motor 30, and the counter electromotive force is eliminated.

In this case, by making the program so that the ON time t2 of the FET 12 is set corresponding to the ON time t1 of the FET 14, the FET 12 can be turned ON only when the counter electromotive force is generated in the DC motor 30. Accordingly, it is prevented that the short circuit is caused between terminals 31 and 32 of the DC motor 30 and the DC motor 30 is braked, under the condition that the regenerative current does not flow.

By repeating the processing of the steps S22 to 25 at a predetermined period T, the speed control of the DC motor 30 at the time of positive rotation can be conducted.

Figure 15:
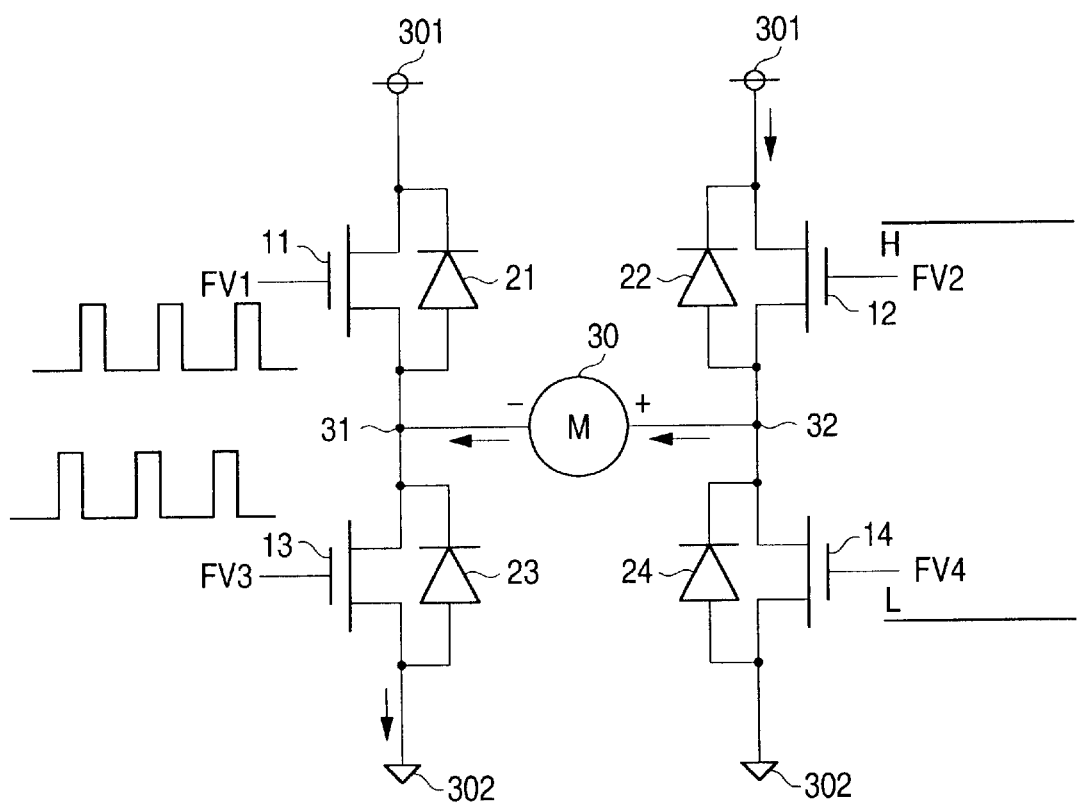
FIG. 15 is a circuit diagram showing the operation of the DC motor driving apparatus at the time of the reversal rotation of the DC motor in FIG. 12.
Figure 16:
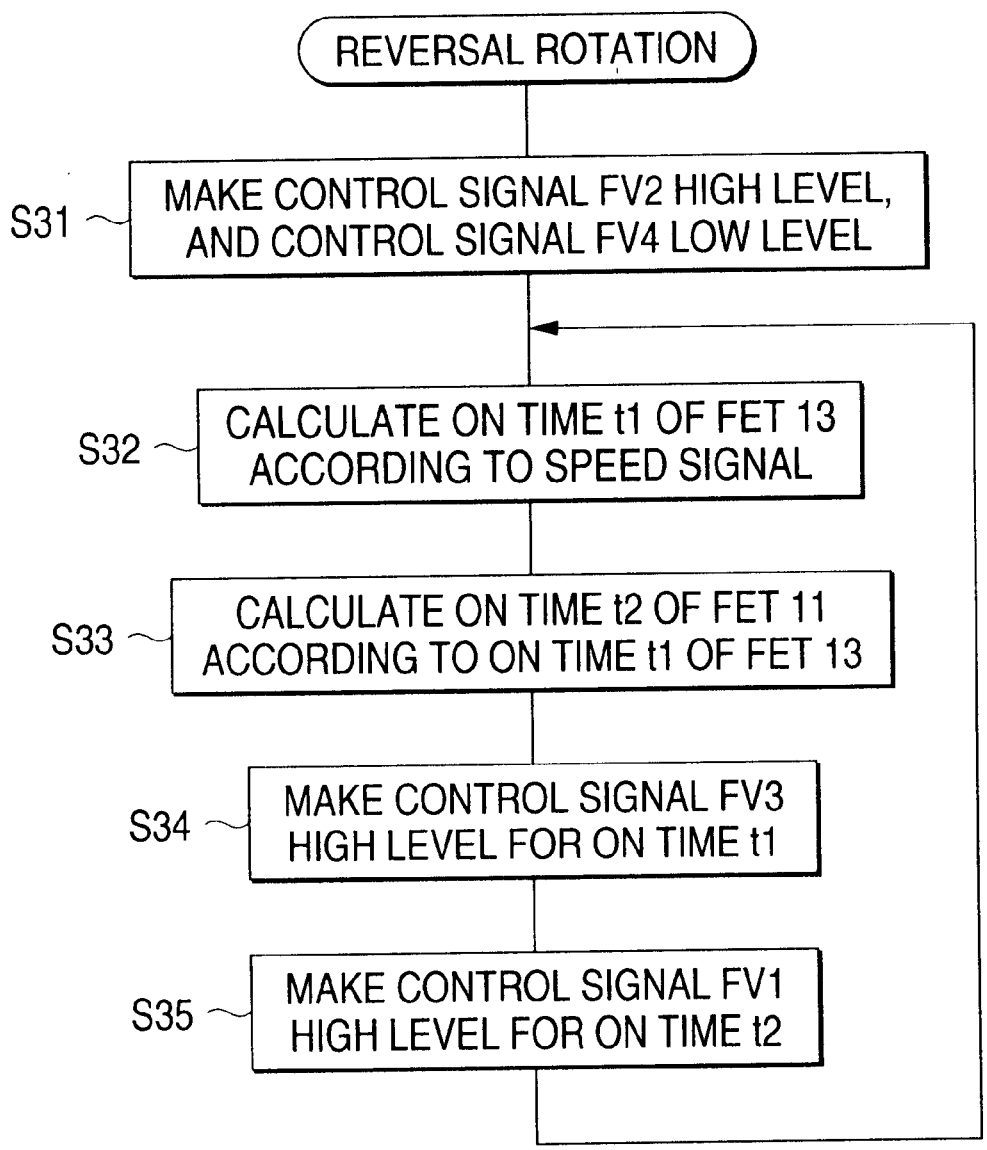
FIG. 16 is a flow chart showing the operation of the CPU at the time of the reversal rotation of the DC motor in FIG. 12.

FIG. 15 is a circuit diagram showing the operation of the DC motor driving apparatus 603 at the time of the reversal rotation of the DC motor 30 in FIG. 12, and FIG. 16 is a flow chart showing the operation of the CPU 203 at the time of the reversal rotation of the DC motor 30 in FIG. 12.

At the time of reversal rotation of the DC motor 30, initially, the CPU 203 makes the control signal FV2 high level, and the control signal FV4 low level (step S31). According to that, the FET 12 is turned ON, and the FET 14 is turned OFF.

Next, the CPU 203 calculates the ON time t1 of the FET 13 according to the speed signal supplied from the receiver 100 (step S32). Further, the CPU 203 calculates the ON time t2 of the FET 11 according to the ON time t1 of the FET 13 (step 333).

Next, the CPU 203 makes the control signal FV3 high level for the ON time t1 (step S34). Thereby, the FET 13 is turned ON. As the result, as shown by an arrow, the current flows from the power supply 301 to the ground terminal 302 through the FET 12, terminal 32, DC motor 30, terminal 31 and the FET 13, and the DC motor 30 is reversely rotated.

When the control signal FV3 is the low level, the FET 13 is turned OFF. Thereby, the current does not flow to the DC motor 30. In this case, the counter electromotive force is generated in the DC motor 30, and the potential of the terminal 31 is higher than the potential of the terminal 32 and the power supply terminal 301.

The CPU 203 makes the control signal FV1 high level for the ON time t2 (step S35). Thereby, the FET 11 is turned ON. As the result, the regenerative current flows from the terminal 31 to the terminal 32 through the FET 11, the power supply terminal 301 and FET 12 due to the counter electromotive force generated in the DC motor 30, and the counter electromotive force is eliminated.

In this case, by making the program so that the ON time t2 of the FET 11 is set corresponding to the ON time t1 of the FET 13, the FET 11 can be turned ON only when the counter electromotive force is generated in the DC motor 30. Accordingly, it is prevented that the short circuit is caused between terminals 31 and 32 of the DC motor 30 and the DC motor 30 is braked, under the condition that the regenerative current does not flow.

By repeating the processing of the steps S32 to S35 at a predetermined period T, the speed control of the DC motor 30 at the time of reversal rotation can be conducted.

The operation of the DC motor driving apparatus 603 at the time of braking of the DC motor 30 in FIG. 12, is the same as the operation of the DC motor driving apparatus 602 of the third embodiment.

In the DC motor driving apparatus 603 of the present embodiment, because the drop voltage when the FETs 11, 12, 13 and 14 are ON, is not larger than about 0.05 V and is smaller as compared to the forward voltage of about 0.4 V of the Schottky diode, the heat generation amount due to the voltage drop is very small. Thereby, the drive efficiency of the DC motor 30 is increased.

Specifically, when the DC motor driving apparatus 603 is used for the electric radio control car, the travel time is extended.

Further, because the temperature rise of the FETs 11, 12, 13 and 14 can be suppressed, the long period of time use under the high temperature becomes possible, and the damage due to the heat generation can also be avoided.

Further, because it is not necessary to connect the Schottky diode, the reduction of the size of the DC motor driving apparatus 54. 603 can be attained.

Further, the control signal FV1, FV2, FV3 and FV4 can be made by the program, and because it is not necessary to provide the comparators 41, 42 and the switches SW11 and SW12, the size of the DC motor driving apparatus 603 can be further reduced.

Figure 17:
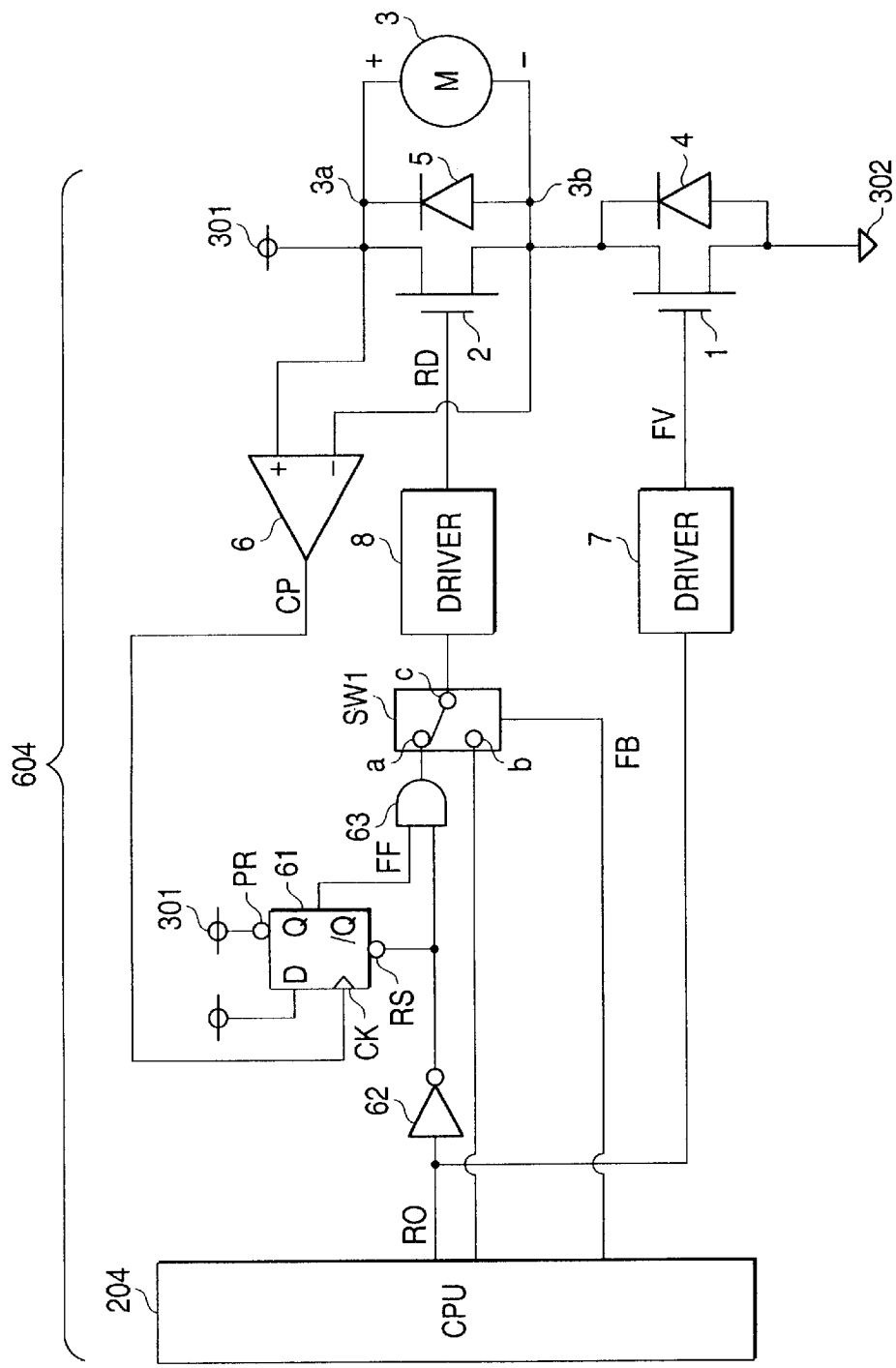
FIG. 17 is a circuit diagram of the DC motor driving apparatus in the fifth embodiment of the present invention.

FIG. 17 is a circuit diagram of the DC motor driving apparatus in the fifth embodiment of the present invention. The different point of the DC motor driving apparatus 604 in FIG. 17 from the DC motor driving apparatus 600 in FIG. 1 is that the flip-flop circuit 61, inverter 62, and AND gate 63 are further provided.

The non-reversal input terminal of the comparator 6 is connected to the terminal 3*a* of the DC motor 3, and the reversal input terminal of the comparator 6 is connected to the terminal 3*b* of the DC motor 3. The output terminal of the comparator 6 is connected to the clock terminal CK of the flip-flop circuit 61. The data terminal D and the reset terminal PR of the flip-flop circuit 61 are connected to the power supply terminal 301. The output signal outputted from the reversal output terminal/Q of the flip-flop circuit 61 is supplied to one input terminal of the AND gate 63.

The CPU 204 is connected to the receiver (not shown). The receiver receives the signal transmitted from the remote controller, and sends the speed signal to the CPU 204. The CPU 204 sends the control signal RO to the inverter 62 and the driver 7. The driver 7 sends the control signal RO to the gate of the FET 1 as the control signal FV. Further, the CPU 204 sends the control signal to the terminal b of the switch SW1. The output signal of the inverter 62 is sent to the reset terminal RS of the flip-flop circuit 61 and the other input terminal of the AND gate 63. The output signal of the AND gate 63 is sent to the terminal a of the SW1. The control signal RD is sent to the gate of the FET 2 from the terminal c of the switch SW1 through the driver 8.

The switch SW1 is switched by the switching signal FB sent from the CPU 204. At the time of the positive rotation of the DC motor 3, the switch SW1 is switched to the terminal a side of the switch SW1, and at the time of the braking of the DC motor, the switch SW1 is switched to the terminal b side. Incidentally, the switching signal FB may also be made from the output signals of the drivers 7 and 8.

In the present embodiment, the FET 1 corresponds to the first transistor and the first switching means, the FET 2 corresponds to the second transistor and the second switching means, and the comparator 6, flop-flop circuit 61, inverter 62, and AND gate 63 correspond to the control circuit and the control means. Further, the comparator 6 corresponds to the comparator and the counter electromotive force detection means, and the flop-flop circuit 61, inverter 62, and AND gate 63 correspond to the control signal generation circuit and the switching control means. The output signal CP of the comparator 6 corresponds to the detection signal.

Figure 18:
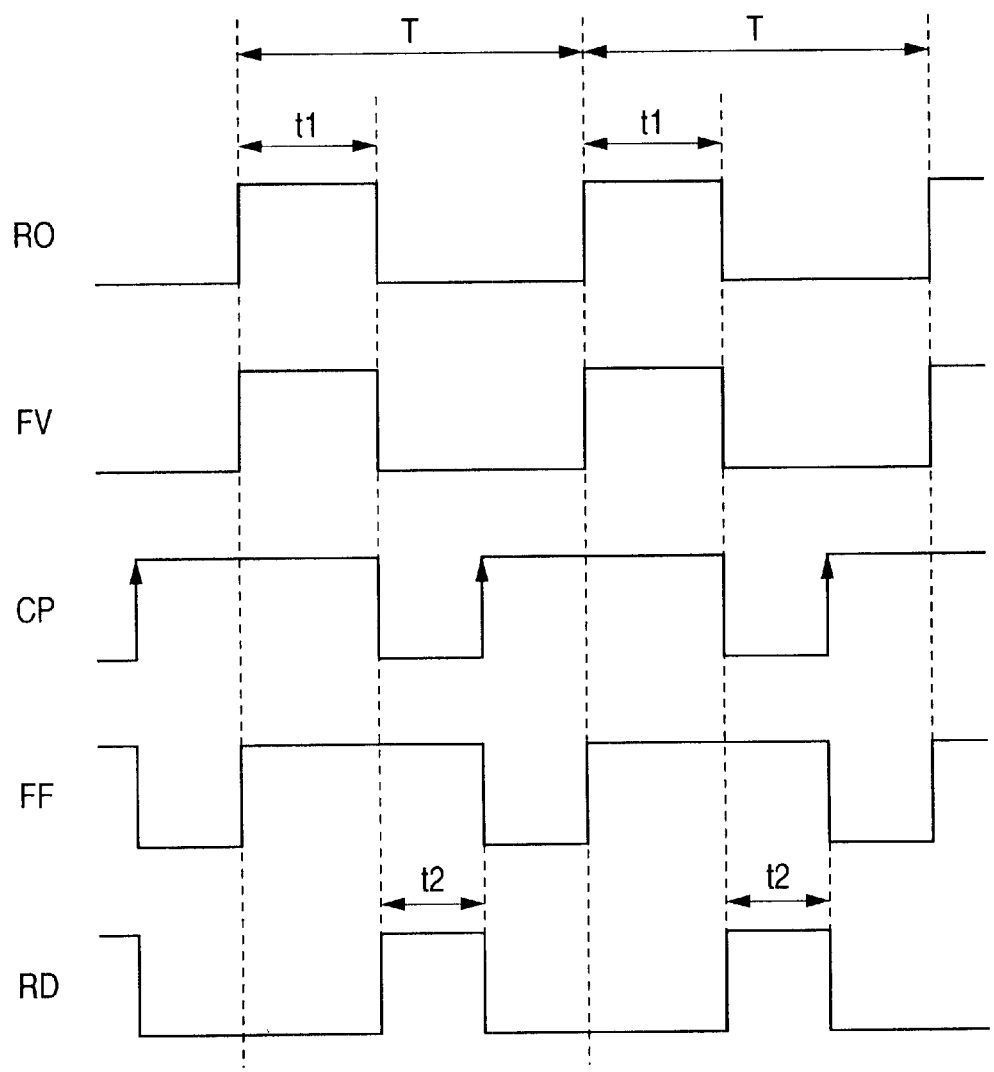
FIG. 18 is a view of signal waveforms showing the operation of the DC motor driving apparatus at the time of the positive rotation of the DC motor in FIG. 17.

FIG. 18 is a view of the signal waveform showing the operation of the DC motor driving apparatus 604 at the time of the positive rotation of the DC motor 3 in FIG. 17.

At the time of the positive rotation of the DC motor 3, the control signal RO changes between the high level and the low level in a predetermined period. The control signal FV changes with the same phase as the control signal RO. During the period of high level of the control signal FV, the FET 1 is turned ON. Thereby, the current flows from the terminal 301 of the power supply to the ground terminal 302 through the terminal 3*a*, DC motor 3, terminal 3*b*, and FET 1, and the DC motor 3 is positively rotated. By controlling the ON time t1 of the FET 1 in a predetermined period T, the current supplied to the DC motor 3 is controlled, and the rotation speed of the DC motor 3 can be controlled.

When the control signals RO, and FV are on high level, the output signal of the inverter 62 is on low level. Thereby, the flip-flop circuit 61 is reset, and the output signal FF is on high level. Further, the output signal of the AND gate 63 is on low level, and the control signal RD outputted from the driver 8 is on low level. Accordingly, the FET 2 is turned OFF. Further, because the potential of the terminal 3*a* of the DC motor 3 is higher than the potential of the terminal 3*b*, the output signal CP of the comparator 6 is on high level.

When the control signal FV becomes low level, the FET 1 is turned OFF. Thereby, the current is not supplied to the DC motor 3. In this case, the counter electromotive force is generated in the DC motor 3, and the potential of the terminal 3*b* is higher than the potential of the terminal 3*a*. Thereby, the output signal CP of the comparator 6 becomes low level. At this time, because the output signal of the inverter 62 becomes high level, the reset of the flip-flop circuit 61 is released, and the output signal of the AND gate 63 rises to the high level. Thereby, the control signal RD outputted from the driver 8 becomes high level, and the FET 2 is turned ON. As the result, the regenerative current flows from the terminal 3*b* to the terminal 3*a* through the FET 2 by the counter electromotive force generated in the DC motor 3, and the counter electromotive force is deleted.

When the potential of the terminal 3*b* of the DC motor 3 is lower than the potential of the terminal 3*a*, the output signal CP of the comparator 6 rises to the high level. Thereby, the output signal FF of the flip-flop circuit 61 falls to the low level, and the output signal of the AND gate 63 falls to the low level. As the result, the control signal RD outputted from the driver 8 becomes low level, and the FET 2 is turned OFF.

In this case, the ON time t2 of the FET 2 is controlled at real time so that the FET 2 is turned ON only when the counter electromotive force is generated in the DC motor 3, corresponding to the ON time t1 of the FET 1. Accordingly, it is prevented that terminals 3a and 3b of the DC motor 3 are short circuited and the DC motor 3 is braked, under the condition that the regenerative current does not flow.

As described above, in the DC motor driving apparatus 604 of the present embodiment, because the output signal CP of the comparator 6 is held in the flip-flop circuit 61 once, and the control signal RD to control the FET 2 according to the output signal FF of the flip-flop circuit 61 is made, the control signal RD is hardly affected by the noise of the terminals 3a and 3b of the DC motor 3. Accordingly, in addition to the effect of the DC motor driving apparatus 600 in FIG. 1, the effect that the more stable operation is possible, can be obtained.

Incidentally, the structure of the logical circuit to supply the control signal RD to the FET 2 is not limited to the above embodiment, but may be the structure of another logical circuit, for example, the reversal logical circuit may be used. Further, in order to conduct the positive operation, delay may be provided to each signal.

Figure 19:
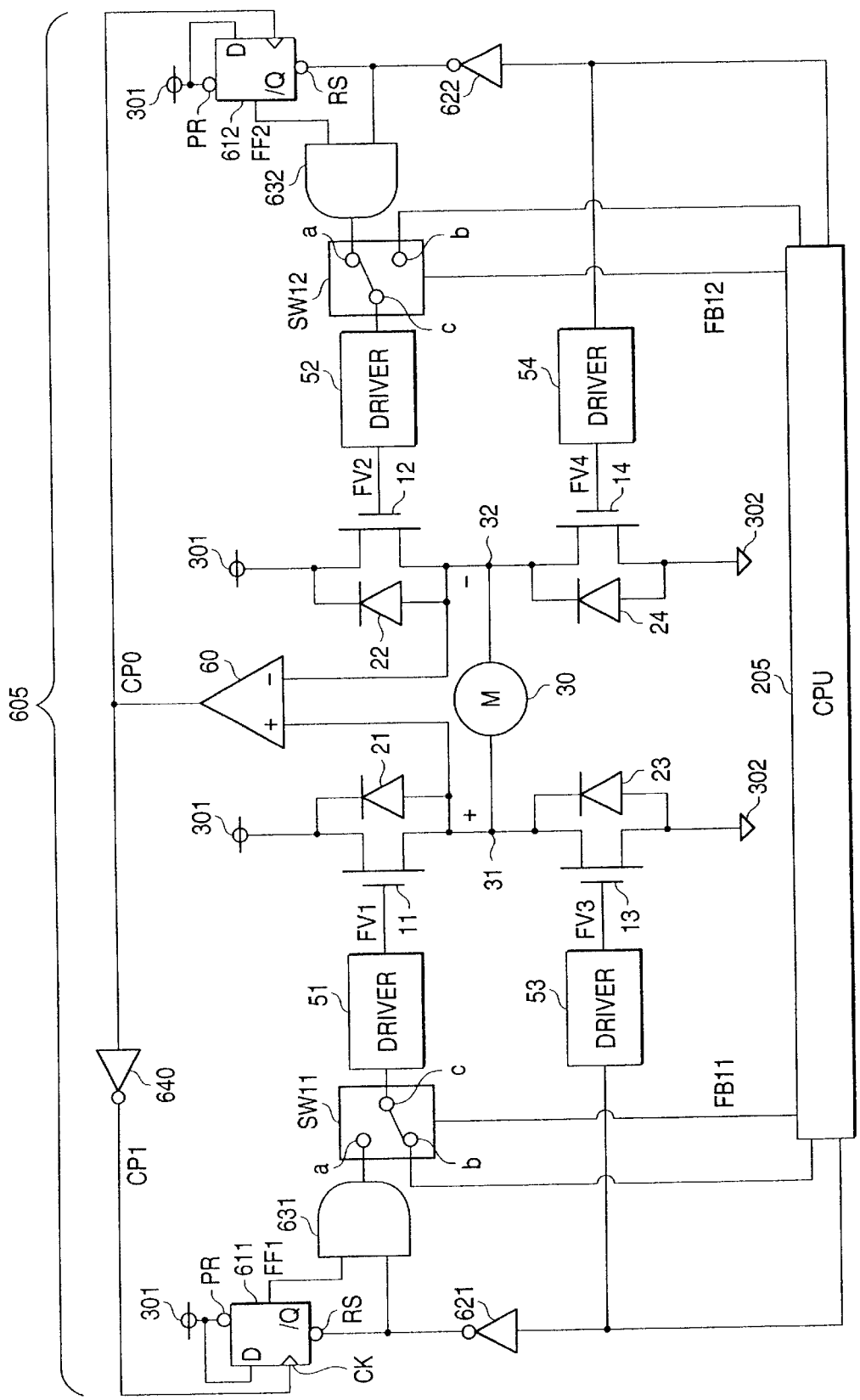
FIG. 19 is a circuit diagram of the DC motor driving apparatus in the sixth embodiment of the present invention.

FIG. 19 is a circuit diagram of the DC motor driving apparatus in the fifth embodiment of the present invention. The different point of the DC motor driving apparatus 605 in FIG. 19 from the DC motor driving apparatus 602 in FIG. 5 is that one comparator 60 is provided, and the inverter 640, flip-flop circuits 611, 612 and AND gates 631 and 632 are further provided.

The non-reversal input terminal of the comparator 60 is connected to the terminal 31 of the DC motor 30, and the reversal input terminal of the comparator 60 is connected to the terminal 32 of the DC motor 30. The output terminal of the comparaotr 60 is connected to the clock terminal CK of the flip-flop circuit 612, and through the inverter 640 to the clock terminal CK of the flip-flop circuit 611. The output signal FF1 outputted from the reversal output terminal/Q of the flop-flop circuit 611 is supplied to one input terminal of the AND gate 631. The output signal FF2 outputted from the reversal output terminal/Q of the flip-flop circuit 612 is supplied to one input terminal of the AND gate 632.

The drivers 53, 54, inverters 621, 622, the terminal b of the switch SW11 and the terminal b of the switch SW12 are connected to the CPU 205.

The output signal of the inverter 621 is supplied to the reset terminal RS of the flip-flop circuit 611 and the other input terminal of the AND gate 631. The output signal of the AND gate 631 is supplied to the terminal a of the switch SW11. The driver 51 is connected to the terminal c of the switch SW11. The output signal of the driver 51 is supplied to the gate of the FET 11 as the control signal FV1. The output signal of the driver 53 is supplied to the gate of the FET 13 as the control signal FV3.

On the one hand, the. output signal of the inverter 622 is supplied to the reset terminal RS. of the flip-flop circuit 612 and the other input terminal of the AND gate 632. The output signal of the AND gate 632 is supplied to the terminal a of the switch SW12. The driver 52 is connected to the terminal c of the switch SW12. The output signal of the driver 52 is supplied to the gate of the FET 12 as the control signal FV2. The output signal of the driver 54 is supplied to the gate of the FET 14 as the control signal FV4.

The CPU 205 is connected to the receiver (not shown). The receiver receives the signal transmitted from the remote controller, and sends the speed signal to the CPU 205. The CPU 205 sends the control signal to the inverter 621 and the driver 53 according to the speed signal supplied from the receiver, and supplies the control signal to the terminal b of the switch SW11, supplies the control signal to the inverter 622 and the driver 54, and supplies the control signal to the terminal b of the switch SW12.

Switches SW11 and Sw12 are respectively switched by switching signals FB11 and FB12 supplied from the CPU 205. At the time of the positive rotation of the DC motor 30, the switch SW11 is switched to terminal b side, and the switch SW12 is switched to the terminal a side. At the time of the reversal rotation of the DC motor 30, the switch SW11 is switched to the terminal a side, and the switch Sw12 is switched to the terminal b side. At the time of the braking of the DC motor 30, the switch SW11 is switched to the terminal b side, and the switch 12 is switched to the terminal b side. Incidentally, the switching signals FB11 and FB12 may also be made from the output signals of the drivers 51 to 54.

In the present embodiment, the FET 11 corresponds to the first transistor and the first switching means, the FET 12 corresponds to the second transistor and the second switching means, the FET 13 corresponds to the third transistor and the third switching means, and the FET 14 corresponds to the fourth transistor and the fourth switching means.

Further, the comparator 60, flop-flop circuit 611, inverters 621, 640 and AND gate 631 correspond to the first control circuit and the first control means, and the comparator 60, flop-flop circuit 612, inverter 622, and AND gate 632 correspond to the second control circuit and the second control means.

Further, the comparator 60, and the inverter 640 correspond to the first comparator and the first counter electromotive force detection means, and the flop-flop circuit 611, inverter 621, and AND gate 631 correspond to the first control signal generation circuit and the first switching control means, and the comparator 60 correspond to the second comparator and the second counter electromotive force detection means, and the flop-flop circuit 612, inverter 622, and AND gate 632 correspond to the second control signal generation circuit and the second switching control means. The output signal CP0 of the comparator 60 corresponds to the first detection signal, and the output signal CP1 of the inverter 640 corresponds to the second detection signal.

Figure 20:
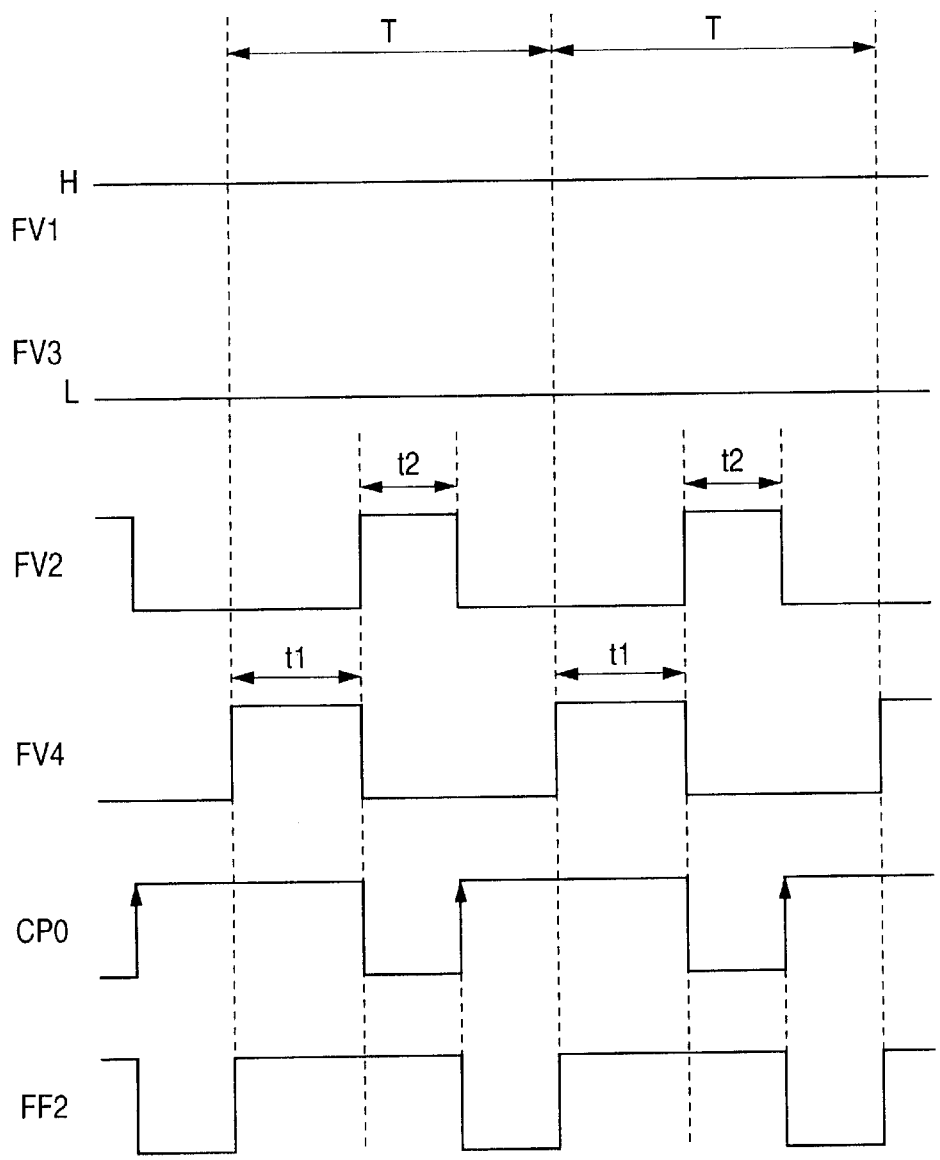
FIG. 20 is a view of signal waveforms showing the operation of the DC motor driving apparatus at the time of the positive rotation of the DC motor in FIG. 19.

FIG. 20 is a view of the signal waveform showing the operation of the DC motor driving apparatus 605 at the time of the positive rotation of the DC motor 30 in FIG. 19.

At the time of the positive rotation of the DC motor 30, the control signal FV1 becomes high level, and the FET 11 is turned ON. Further, the control signal FV3 becomes low level, and the FET 13 is turned OFF.

The control signal FV4 changes between the high level and the low level in a predetermined period T. During the period of high level of the control signal FV4, the FET 14 is turned ON. Thereby, the current flows from the terminal 301 of the power supply to the ground terminal 302 through the FET 11, terminal 31, DC motor 30, terminal 32, and FET 14, and the DC motor 3 is positively rotated.

The ON time t1 of the FET 14 is determined according to the speed signal supplied from the receiver. By controlling the ON time t1 of the FET 14 in a predetermined period T, the current supplied to the DC motor 30 is controlled, and the rotation speed of the DC motor 30 can be controlled.

When the control signals FV4 is on high level, the output signal of the inverter 622 is on low level. Thereby, the flip-flop circuit 612 is reset, and the output signal FF2 is on high level. Further, the output signal of the AND gate 632 is on low level, and the control signal FV2 outputted from the driver 52 is on low level. Accordingly, the FET 12 is turned OFF. Further, because the potential of the terminal 31 of the DC motor 30 is higher than the potential of the terminal 32, the output signal CP0 of the comparator 60 is on high level.

When the control signal FV4 becomes low level, the FET 14 is turned OFF. Thereby, the current is not supplied to the DC motor 30. In this case, the counter electromotive force is generated in the DC motor 30, and the potential of the terminal 32 is higher than the potential of the terminal 31. Thereby, the output signal CP0 of the comparator 60 becomes low level. At this time, because the output signal of the inverter 622 becomes high level, the reset of the flip-flop circuit 612 is released, and the output signal of the AND gate 632 becomes high level, and the control signal FV2 becomes high level. Thereby, the FET 12 is turned ON. As the result, the regenerative current flows to the terminal 31 through the terminal 32, FET 12, power supply terminal 301, and FET 11, by the counter electromotive force generated in the DC motor 30, and the counter electromotive force is deleted.

When the potential of the terminal 32 of the DC motor 30 is lower than the potential of the terminal 31, the output signal CP0 of the comparator 60 rises to the high level. Thereby, the output signal FF2 of the flip-flop circuit 612 falls to the low level. Accordingly, the output signal of the AND gate 632 becomes low level, and the control signal FV2 becomes low level. As the result, the FET 12 is turned OFF.

The ON time t2 of the FET 12 is controlled at real time so that the FET 12 is turned ON only when the counter electromotive force is generated in the DC motor 30, corresponding to the ON time t1 of the FET 14. Accordingly, it is prevented that terminals 31 and 32 of the DC motor 30 are short circuited and the DC motor 30 is braked, under the condition that the regenerative current does not flow.

Figure 21:
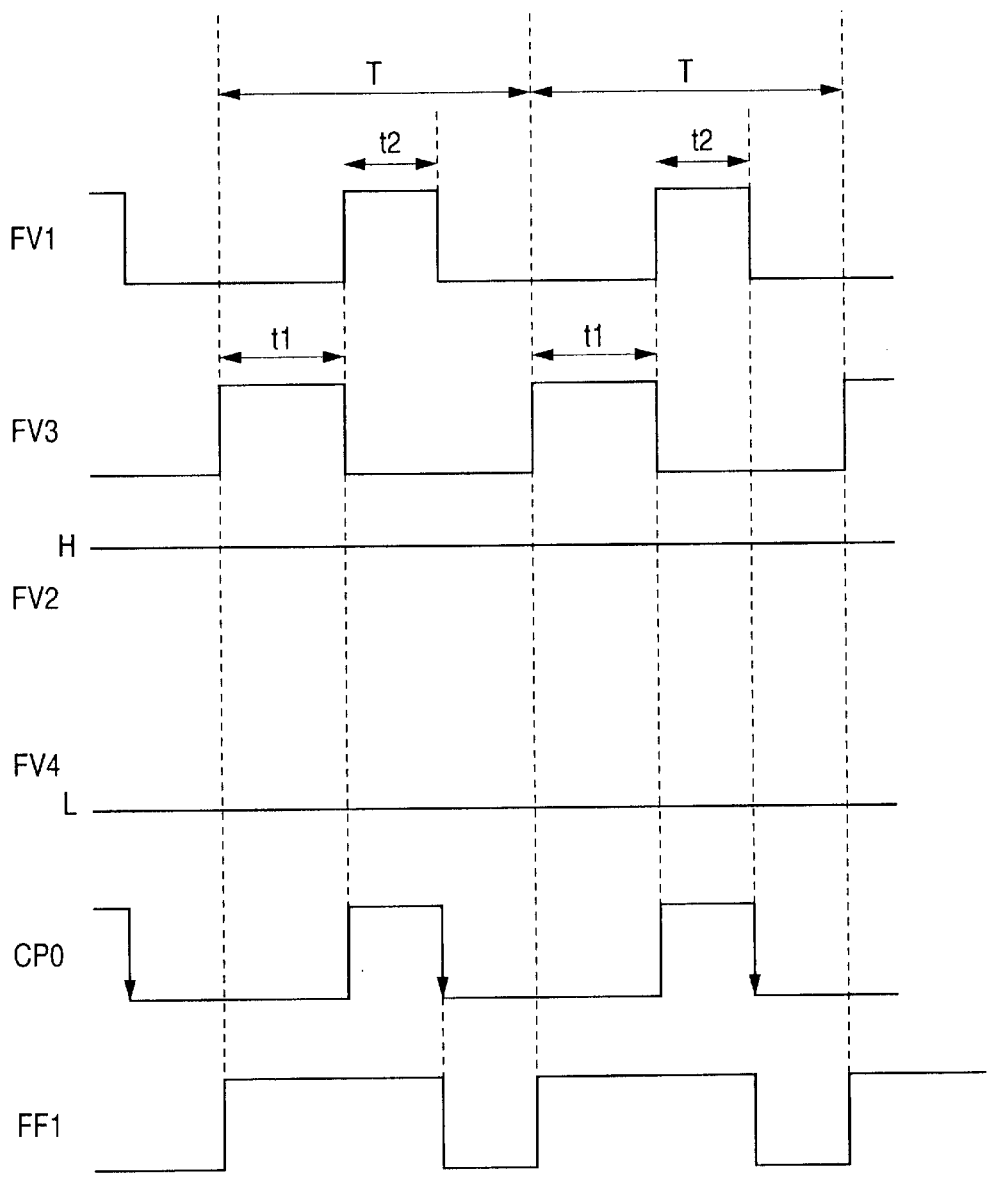
FIG. 21 is a view of signal waveforms showing the operation of the DC motor driving apparatus at the time of the reversal rotation of the DC motor in FIG. 19.

FIG. 21 is a view of the signal waveform showing the operation of the DC motor driving apparatus 605 at the time of the reversal rotation of the DC motor 30 in FIG. 19.

At the time of the reversal rotation of the DC motor 30, the control signal FV2 becomes high level, and the FET 12 is turned ON. Further, the control signal FV4 becomes low level, and the FET 14 is turned OFF.

The control signal FV3 changes between the high level and the low level in a predetermined period T. During the period of high level of the control signal FV3, the FET 13 is turned ON. Thereby, the current flows from the terminal 301 of the power supply to the ground terminal 302 through the FET 12, terminal 32, DC motor 30, terminal 31, and FET 13, and the DC motor 30 is reversely rotated.

The ON time t1 of the FET 13 is determined according to the speed signal supplied from the receiver. By controlling the ON time t1 of the FET 13 in a predetermined period T, the current supplied to the DC motor 30 is controlled, and the rotation speed of the DC motor 30 can be controlled.

When the control signals FV3 is on high level, the output signal of the inverter 621 is on low level. Thereby, the flip-flop circuit 611 is reset, and the output signal FF1 is on high level. Further, the output signal of the AND gate 631 is on low level, and the control signal FV1 outputted from the driver 51 is on low level. Accordingly, the FET 11 is turned OFF. Further, because the potential of the terminal 32 of the DC motor 30 is higher than the potential of the terminal 31, the output signal CP0 of the comparator 60 becomes low level, and the output signal CP1 of the inverter 640 is on high level.

When the control signal FV3 becomes low level, the FET 13 is turned OFF. Thereby, the current is not supplied to the DC motor 30. In this case, the counter electromotive force is generated in the DC motor 30, and the potential of the terminal 31 is higher than the potential of the terminal 32. Thereby, the output signal CP0 of the comparator 60 becomes high level, and the output signal CP1 of the inverter 640 becomes low level. Further, because the output signal of the inverter 621 becomes high level, the reset of the flip-flop circuit 611 is released, and the output signal of the AND gate 631 becomes high level, and the control signal FV1 becomes high level. Thereby, the FET 11 is turned ON. As the result, the regenerative current flows to the terminal 32 through the terminal 31, FET 11, power supply terminal 301, and FET 12, by the counter electromotive force generated in the DC motor 30, and the counter electromotive force is deleted.

When the potential of the terminal 31 of the DC motor 30 is lower than the potential of the terminal 32, the output signal CP0 of the comparator 60 falls to the low level, and the output signal CP1 of the inverter 640 rises to the high level. Thereby, the output signal FF1 of the flip-flop circuit 611 falls to the low level. Accordingly, the output signal of the AND gate 631 becomes low level, and the control signal FV1 becomes low level. As the result, the FET 1 is turned OFF.

The ON time t2 of the FET 11 is controlled at real time so that the FET 11 is turned ON only when the counter electromotive force is generated in the DC motor 30, corresponding to the ON time t1 of the FET 13. Accordingly, it is prevented that terminals 31 and 32 of the DC motor 30 are short circuited and the DC motor 30 is braked, under the condition that the regenerative current does not flow.

The operation of the DC motor driving apparatus 605 of the DC motor 30 at the time of the braking in FIG. 19 is the same as the operation of the DC motor driving apparatus 602 of the DC motor 30 at the time of the braking in FIG. 5 shown in FIG. 10 and FIG. 11. Incidentally, at the time of the neutral of the DC motor 30 in FIG. 19, switches SW11 and SW12 are switched to the terminal b side, and control signals FV1, Fv2, FV3 and FV4 become low level.

As described above, in the DC motor driving apparatus 605 of the present embodiment, at the time of the positive rotation of the DC motor 30, because the output signal CP0 of the comparator 60 is held in the flip-flop circuit 612 once, and the control signal FV2 to control the FET 12 according to the output signal FF2 of the flip-flop circuit 612 is made, the control signal FV2 is hardly affected by the noise of the terminals 31 and 32 of the DC motor 30. Further, at the time of the reversal rotation of the DC motor 30, because the output signal CP1 of the inverter 640 is held in the flip-flop circuit 611 once, and the control signal FV1 to control the FET 11 according to the output signal FF1 of the flip-flop circuit 611 is made, the control signal FV1 is hardly affected by the noise generated in the terminals 31 and 32 of the DC motor 30. Accordingly, in addition to the effect of the DC motor driving apparatus 602 in FIG. 5, the effect that the more stable operation is possible at the time of the positive rotation and the reversal rotation, can be obtained.

Incidentally, the structure of the logical circuit to supply the control signals FV1 and FV2 to the FETs 11 and 12 is not limited to the above embodiment, but the structure of another logical circuit, when it operates in the same manner, may be used, and for example, the reversal logical circuit may be used. Further, in order to conduct the positive operation, delay may be provided to each signal. Further, one more comparator may be provided instead of the inverter 640 in FIG. 19. In this case, the reversal input terminal of the comparator is connected to the terminal 31 of the DC motor 30, and the non-reversal input terminal is connected to the terminal 32 of the DC motor 30, and the output signal of the comparator is supplied to the clock terminal CK of the flip-flop circuit 611.

Figure 22:
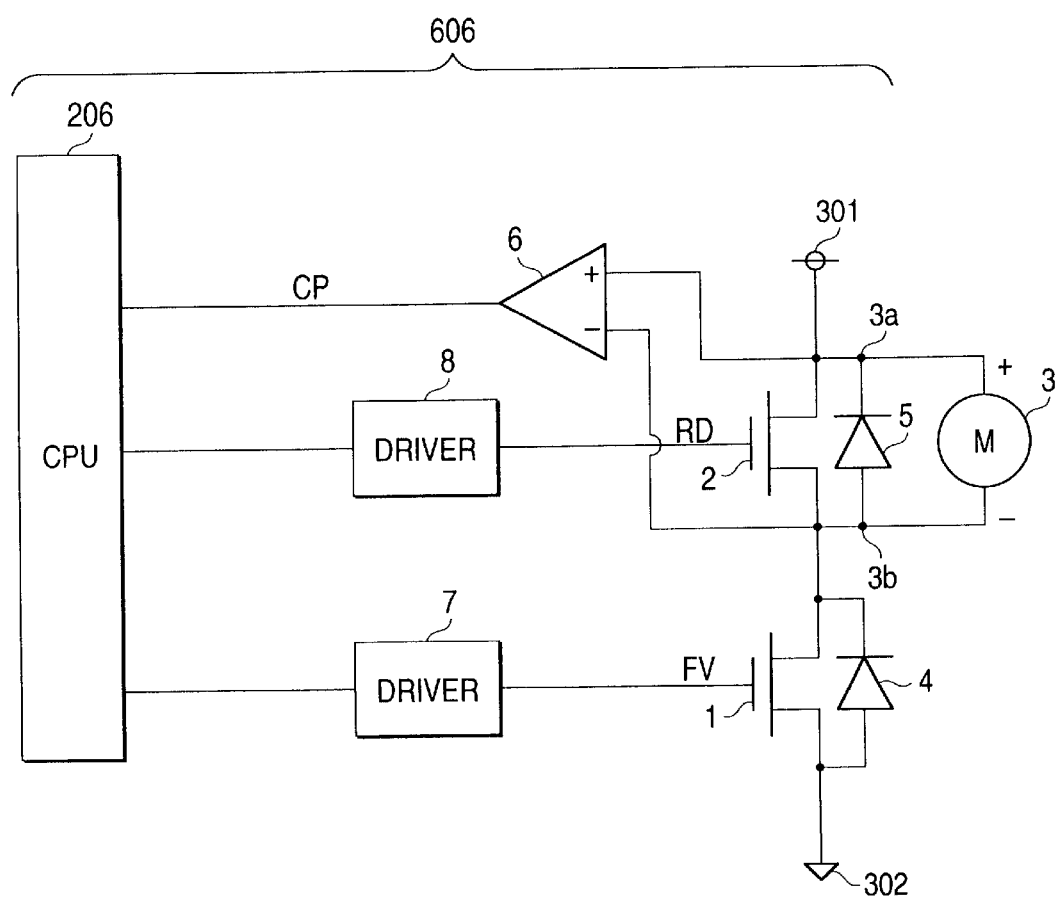
FIG. 22 is a circuit diagram of the DC motor driving apparatus in the seventh embodiment of the present invention.

FIG. 22 is a circuit diagram of the DC motor driving apparatus in the seventh embodiment of the present invention. The different point of the DC motor driving apparatus 606 in FIG. 22 from the DC motor driving apparatus 601 in FIG. 3 is that the comparator 6 is further provided, and the operation of the CPU 206 is different from the operation of the CPU 201 in FIG. 3.

The non-reversal input terminal of the comparator 6 is connected to the terminal a of the DC motor 3, and the reversal input terminal of the comparator 6 is connected to the terminal 3b of the DC motor 3. The output signal CP of the comparator 6 is supplied to the CPU 206. The CPU 206 supplies the control signal FV to the gate of the FET 1 through the driver 7 according to the output signal CP of the comparator 6 and the program, and supplies the control signal RD to the gate of the FET 2 through the driver 8.

In the present embodiment, the FET 1 corresponds to the first transistor and the first switching means, the FET 2 corresponds to the second transistor and the second switching means, and the comparator 6, and the CPU 206 correspond to the control circuit and the control means. Further, the comparator 6 corresponds to the comparator and the counter electromotive force detection means, and the CPU 206 corresponds to the control signal generation circuit and the switching control means. The output signal CP of the comparator 6 corresponds to the detection signal.

Figure 23:
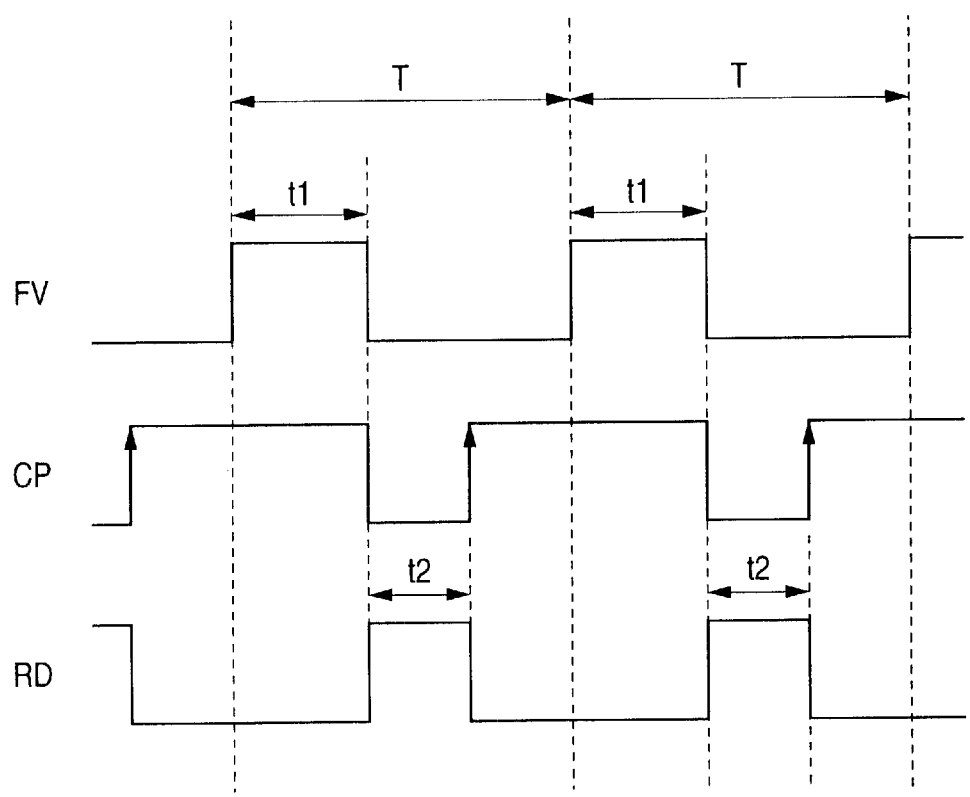
FIG. 23 is a view of signal waveforms showing the operation of the DC motor driving apparatus at the time of the positive rotation of the DC motor in FIG. 22.
Figure 24:
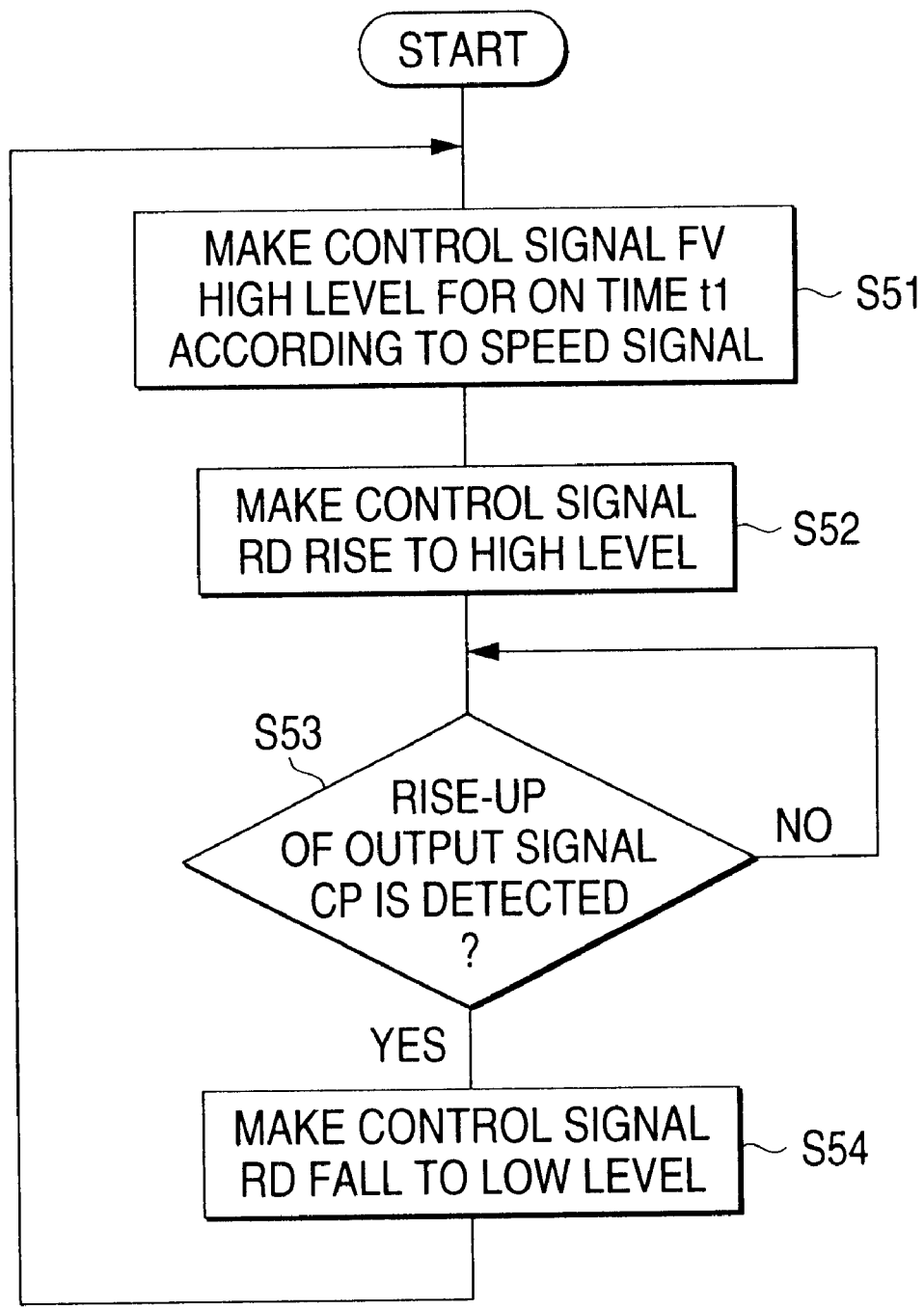
FIG. 24 is a flow chart showing the operation of the CPU at the time of the positive rotation of the DC motor in FIG. 22.

FIG. 23 is a view of the signal waveform showing the operation of the DC motor driving apparatus 606 at the time of the positive rotation of the DC motor 3 in FIG. 22. Further, FIG. 24 is a flow chart showing the operation of the CPU 206 of the DC motor driving apparatus 606 at the time of the positive rotation of the DC motor 3 in FIG. 22.

The CPU 206 initially makes the control signal FV high level for the ON time t1 according to the speed signal supplied from the receiver (not shown) (step S51). Thereby, the FET 1 is turned ON. As the result, the current flows from the power supply terminal 301 to the ground terminal 302 through the terminal 3a, DC motor 3, terminal 3b and FET 1, and the DC motor 3 is positively rotated. At this time, the CPU 206 makes the control signal RD low level. Thereby, the FET 2 is turned OFF. Further, because the potential of the terminal 3a of the DC motor 3 is higher than the potential of the terminal 3b, the output signal CP of the comparator 6 is high level.

When the control signal FV is low level, the FET 1 is turned OFF. Thereby, the current does not flow to the DC motor 3. In this case, the counter electromotive force is generated in the DC motor 3, and the potential of the terminal 3b is higher than the potential of the terminal 3a. Thereby, the output signal CP of the comparator 6 becomes low level.

Next, the CPU 206 makes the control signal RD rise to the high level (step S 52). Thereby, the FET 2 is turned ON. As the result, the regenerative current flows from the terminal 3b to the terminal 3a through the FET 2, by the counter electromotive force generated in the DC motor 3, and the counter electromotive force is deleted.

When the potential of the terminal 3b of the DC motor 3 is lower than the potential of the terminal 3a, the output signal CP of the comparator 60 rises to the high level. When the CPU 206 detects the rise up of the output signal CP of the comparator 6 (step 553), the CPU 206 makes the control signal RD fall to the low level (step S54). Thereby, the FET 2 is turned OFF.

The FET 2 can be turned ON when the counter electromotive force is generated in the DC motor 30, according to the output signal CP of the comparator 6. Accordingly, it is prevented that terminals 3a and 3b of the DC motor 3 are short circuited and the DC motor 3 is braked, under the condition that the regenerative current does not flow.

By repeating the processes of steps S51 to S54 at a predetermined period T, the speed control of the DC motor at the time of the positive rotation can be conducted.

As described above, in the DC motor driving apparatus 606 of the present embodiment, according to the output signal CP of the comparator 6, the FET 2 can be made to turn ON only when the counter electromotive force is generated in the DC motor 3. Accordingly, in addition to the effect of the DC motor driving apparatus 601 in FIG. 3, the effect that the counter electromotive force generated in the DC motor 30 can be more assuredly deleted, can be obtained.

Figure 25:
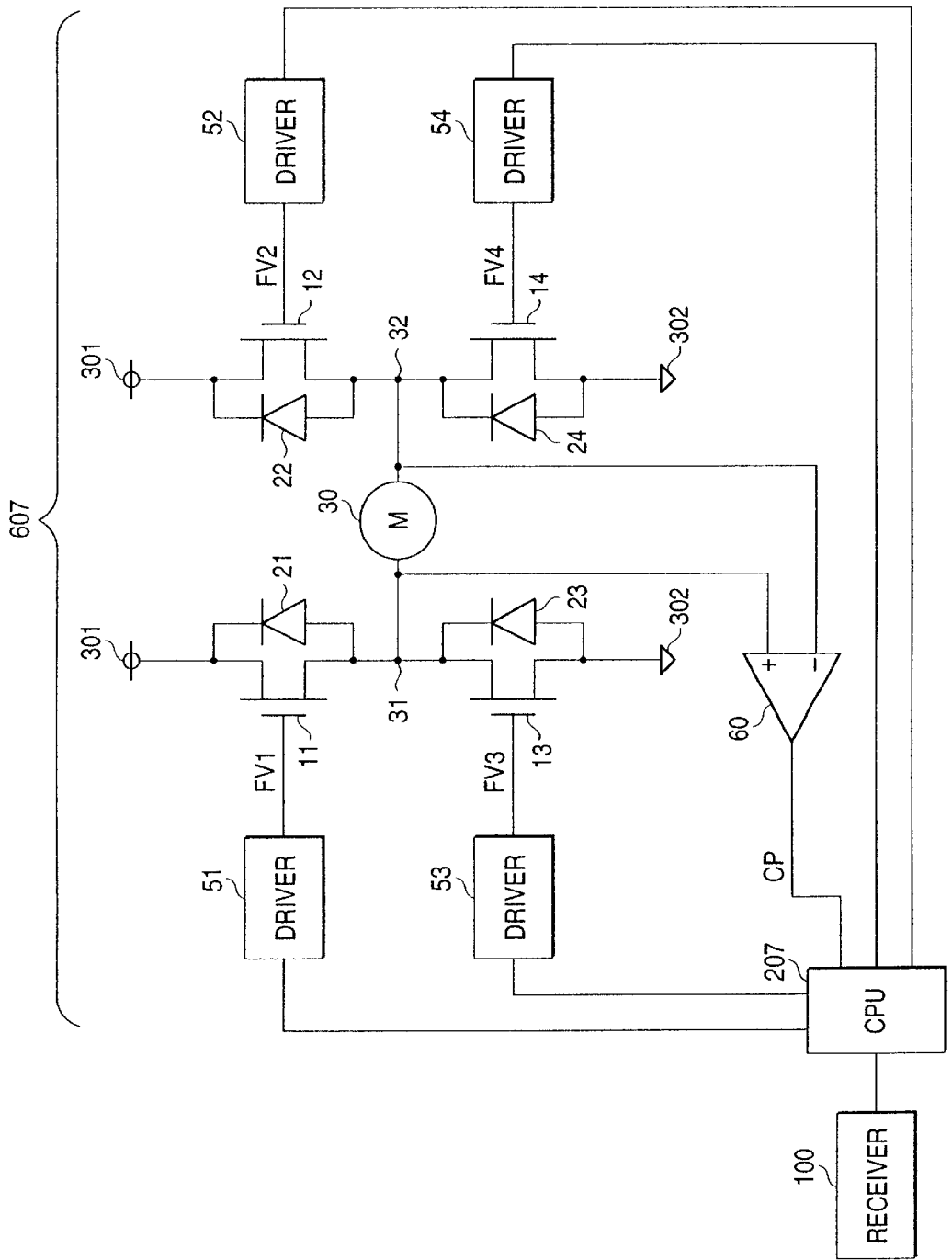
FIG. 25 is a circuit diagram of the DC motor driving apparatus in the eighth embodiment of the present invention.

FIG. 25 is a circuit diagram of the DC motor driving apparatus in the eighth embodiment of the present invention. The different point of the DC motor driving apparatus 607 in FIG. 25 from the DC motor driving apparatus 603 in FIG. 12 is that the comparator 60 is further provided, and the operation of the CPU 207 is different from the operation of the CPU 203.

The non-reversal input terminal of the comparator 60 is connected to the terminal 31 of the DC motor 30, and the reversal input terminal of the comparator 60 is connected to the terminal 32 of the DC motor 30. The output signal CP of the comparator 60 is supplied to the CPU 207. The CPU 207 generates the control signal FV1, FV2, FV3, and FV4 according to the output signal CP of the comparator 60 and the program.

In the present embodiment, the FET 11 corresponds to the first transistor and the first switching means, the FET 12 corresponds to the second transistor and the second switching means, the FET 13 corresponds to the third transistor and the third switching means, and the FET 14 corresponds to the fourth transistor and the fourth switching means.

Further, the comparator 60 and the CPU 207 correspond to the first and second control circuit and the first and second control means. Specifically, the comparator 60 corresponds to the first and second comparator and the first and second counter electromotive force detection means, and the CPU 207 corresponds to the first and second control signal generation circuit and the first and second switching control means. The output signal CP of the comparator 60 corresponds to the detection signal.

Figure 26:
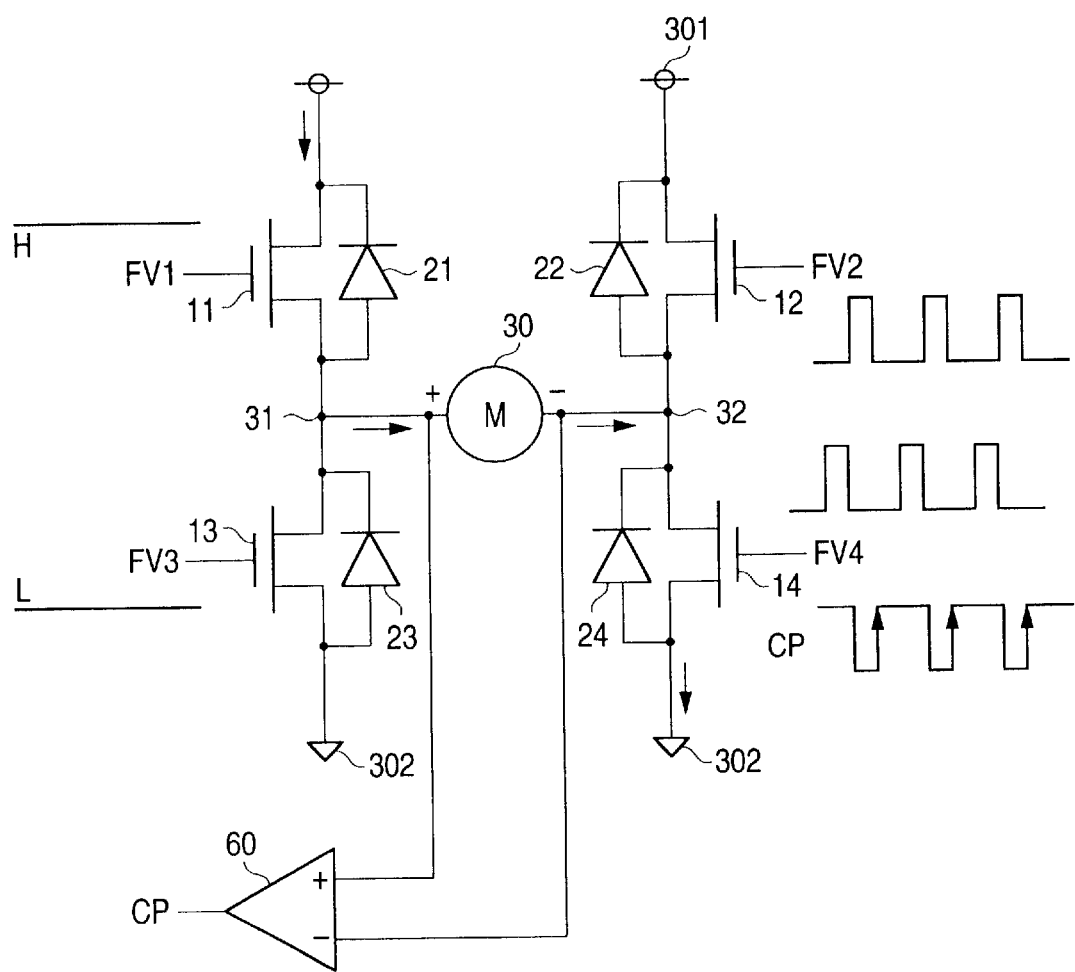
FIG. 26 is a circuit diagram showing the operation of the DC motor driving apparatus at the time of the positive rotation of the DC motor driving apparatus in FIG. 25.
Figure 27:
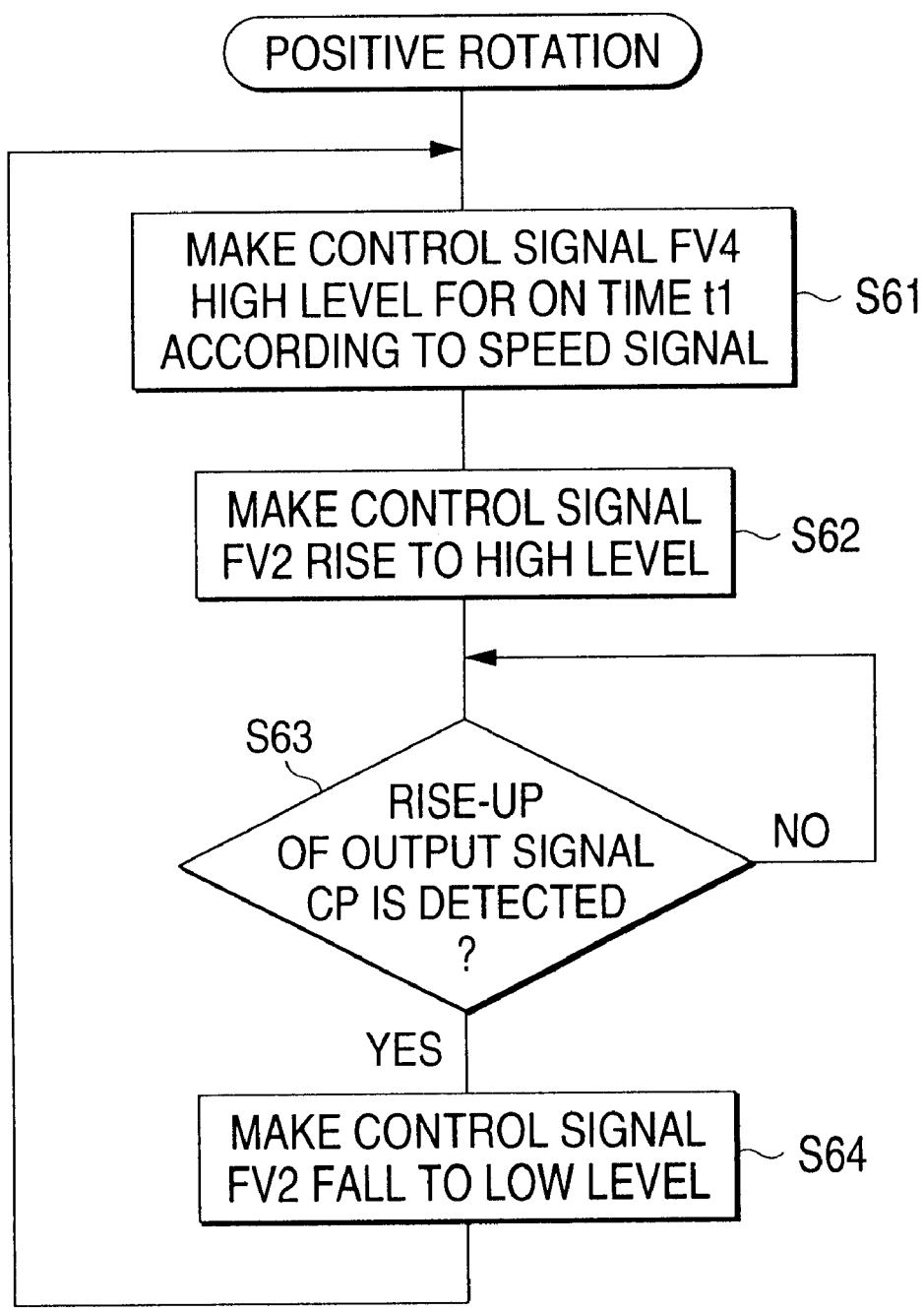
FIG. 27 is a flow chart showing the operation of the CPU at the time of positive rotation of the DC motor in FIG. 25.

FIG. 26 is a circuit diagram showing the operation of the DC motor driving apparatus 607 at the time of the positive rotation of the DC motor 30 in FIG. 25, and FIG. 27 is a flow chart showing the operation of the CPU 207 at the time of the positive rotation of the DC motor 30 in FIG. 25.

At the time of the positive rotation of the DC motor 30, initially, the CPU 207 makes the control signal FV1 high level, and the control signal FV3 low level. Thereby, the FET 11 is turned ON, and the FET 13 is turned OFF.

Next, the CPU 207 initially makes the control signal FV4 high level for the ON time t1 according to the speed signal supplied from the receiver (step S61). Thereby, the FET 14 is turned ON. As the result, the current flows from the power supply terminal 301 to the ground terminal 302 through the FET 11, terminal 31, DC motor 30, terminal 32 and FET 14, and the DC motor 30 is positively rotated. At this time, because the potential of the terminal 31 of the DC motor 30 is higher than the potential of the terminal 32, the output signal CP of the comparator 60 is high level.

When the control signal FV4 is low level, the FET 14 is turned OFF. Thereby, the current does not flow to the DC motor 30. In this case, the counter electromotive force is generated in the DC motor 30, and the potential of the terminal 32 is higher than the potential of the terminal 31. Thereby, the output signal CP of the comparator 60 becomes low level.

Next, the CPU 207 makes the control signal FV2 rise to the high level (step S 62). Thereby, the FET 12 is turned ON. As the result, the regenerative current flows from the terminal 32 to the terminal 31 through the FET 12, power supply terminal 301, and FET 11, by the counter electromotive force generated in the DC motor 30, and the counter electromotive force is deleted.

When the potential of the terminal 32 of the DC motor 30 is lower than the potential of the terminal 31, the output signal CP of the comparator 60 rises to the high level. When the CPU 207 detects the rise up of the output signal CP of the comparator 60 (step S63), the CPU 207 makes the control signal FV2 fall to the low level (step S64). Thereby, the FET 12 is turned OFF.

As described above, the FET 12 can be turned ON only when the counter electromotive force is generated in the DC motor 30, according to the output signal CP of the comparator 60. Accordingly, it is prevented that terminals 31 and 32 of the DC motor 30 are short circuited and the DC motor 30 is braked, under the condition that the regenerative current does not flow.

By repeating the processes of steps S61 to S64 at a predetermined period T, the speed control of the DC motor 30 at the time of the positive rotation can be conducted.

Figure 28:
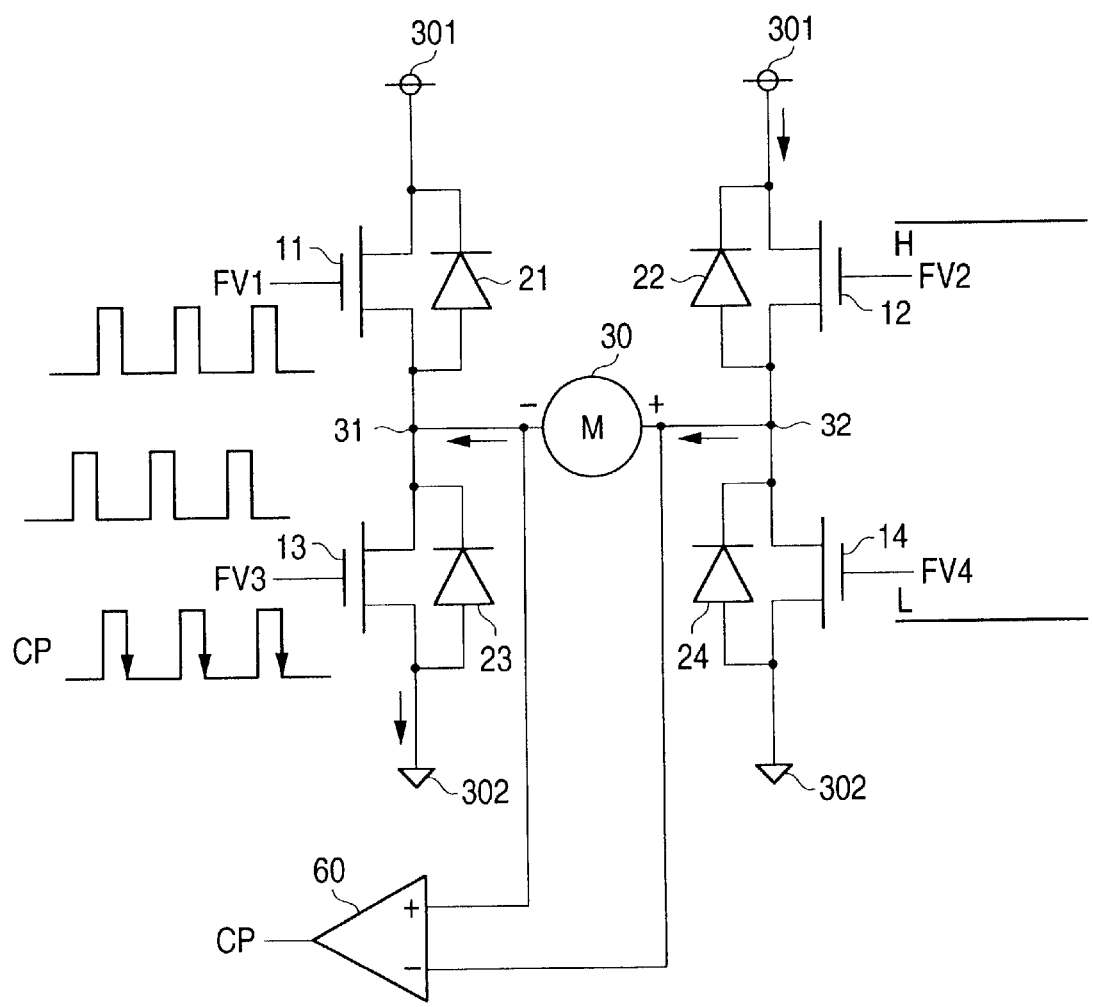
FIG. 28 is a circuit diagram showing the operation of the DC motor driving apparatus at the time of the reversal rotation of the DC motor driving apparatus in FIG. 25.
Figure 29:
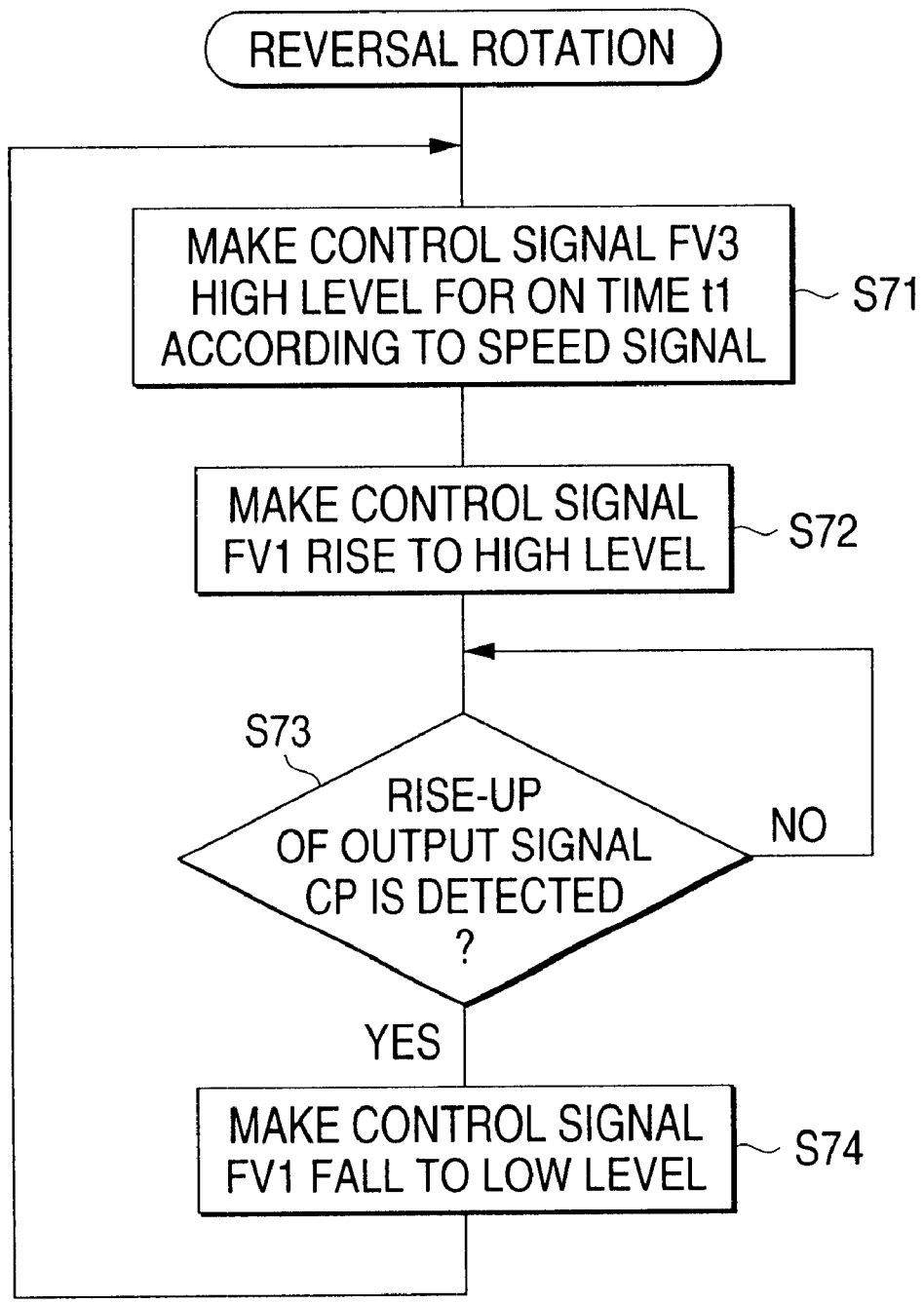
FIG. 29 is a flow chart showing the operation of the CPU at the time of reversal rotation of the DC motor in FIG. 25.

FIG. 28 is a circuit diagram showing the operation of the DC motor driving apparatus 607 at the time of the reversal rotation of the DC motor 30 in FIG. 25, and FIG. 29 is a flow chart showing the operation of the CPU 207 at the time of the reversal rotation of the DC motor 30 in FIG. 25.

At the time of the reversal rotation of the DC motor 30, initially, the CPU 207 makes the control signal FV2 high level, and the control signal FV4 low level. Thereby, the FET 12 is turned ON, and the FET 14 is turned OFF.

Next, the CPU 207 makes the control signal FV3 rise to the high level for ON time t1 according to the speed signal supplied from the receiver (step S 71). Thereby, the FET 13 is turned ON. As the result, the current flows from the power supply terminal 301 to the ground terminal 302 through the FET 12, terminal 32, DC motor 30, terminal 31, and FET 13, and the DC motor 30 is reversely rotated.

At this time, the potential of the terminal 32 of the DC motor 30 is higher than the potential of the terminal 31, the output signal CP of the comparator 60 is on the low level.

When the control signal FV3 becomes low level, the FET 13 is tuned OFF. Thereby, the current does not flow to the DC motor 30. In this case, the counter electromotive force generates in the DC motor 30, and the potential of the terminal 31 is higher than the potential of the terminal 32. Thereby, the output signal CP of the comparator 60 becomes high level.

Next, the CPU 207 makes the control signal FV1 rise to the high level (step S72). Thereby, the FET 11 is turned ON. As the result, the regenerative current flows from the terminal 31 to the terminal 32 through the FET 11, power supply terminal 301, and FET 12, by the counter electromotive force generated in the DC motor 30, and the counter electromotive force is deleted.

When the potential of the terminal 31 of the DC motor 30 is lower than the potential of the terminal 32, the output signal CP of the comparator 60 falls to the low level. When the CPU 207 detects the fall of the output signal CP of the comparator 60 (step S73), the CPU 207 makes the control signal FV1 fall to the low level (step S74). Thereby, the FET 11 is turned OFF.

As described above, the FET 11 can be turned ON only when the counter electromotive force is generated in the DC motor 30, according to the output signal CP of the comparator 60. Accordingly, it is prevented that terminals 31 and 32 of the DC motor 30 are short circuited and the DC motor 30 is braked, under the condition that the regenerative current does not flow.

By repeating the processes of steps S71 to S74 at a predetermined period T, the speed control of the DC motor 30 at the time of the reversal rotation can be conducted.

The operation of the DC motor driving apparatus 607 at the time of the braking of the DC motor 30 in FIG. 25, is the same as the operation of the DC motor driving apparatus 602 in FIG. 5, shown in FIG. 10 and FIG. 11.

As described above, in the DC motor driving apparatus 607 of the present embodiment, according to the output signal CP of the comparator 60, the FETs 12 and 11 can be made to turn ON only when the counter electromotive force is generated in the DC motor 30, at the time of the positive rotation and the reversal rotation of the DC motor 30. Accordingly, in addition to the effect of the DC motor driving apparatus 603 in FIG. 12, the effect that the counter electromotive force generated in the DC motor 30 can be more assuredly deleted, can be obtained.

Figure 30:
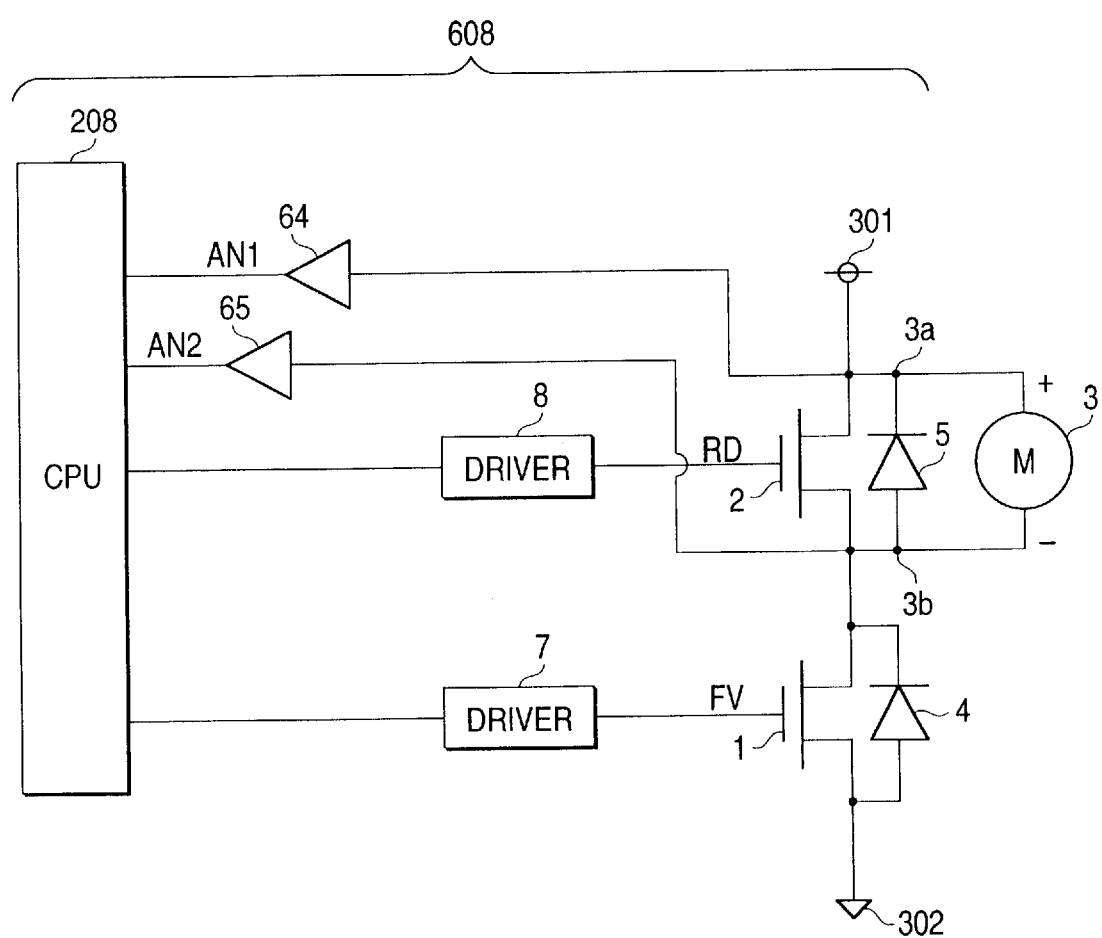
FIG. 30 is a circuit diagram of the DC motor driving apparatus in the ninth embodiment of the present invention.

FIG. 30 is a circuit diagram of the DC motor driving apparatus in the ninth embodiment of the present invention. The different point of the DC motor driving apparatus 608 in FIG. 30 from the DC motor driving apparatus 606 in FIG. 22 is that buffer amplifiers 64 and 65 are provided instead of the comparator 6.

The input terminal of the buffer amplifier 64 is connected to the terminal 3a of the DC motor 3, and the input terminal of the buffer amplifier 65 is connected to the terminal 3b of the DC motor 3. The analog signal AN1 outputted from the buffer amplifier 64 is supplied to the CPU 208. The CPU 208 houses therein A/D converter (analog/digital converter, and respectively converts the analog signals AN1 and AN2 to the digital signal, and by comparing the values of the converted digital signals, compares the level of the analog signal AND and the analog signal AN2.

The CPU 208 supplies the control signal FV to the gate of the FET 1 through the driver 7 according to the speed signal supplied from the receiver, and supplies the control signal PD to the gate of the FET 2 through the driver 8.

In the present embodiment, the FET 1 corresponds to the first transistor and the first switching means, the FET 2 corresponds to the second transistor and the second switching means, and the buffer amplifiers 64 and 65, and the CPU 208 correspond to the control circuit and the control means.

Figure 31:
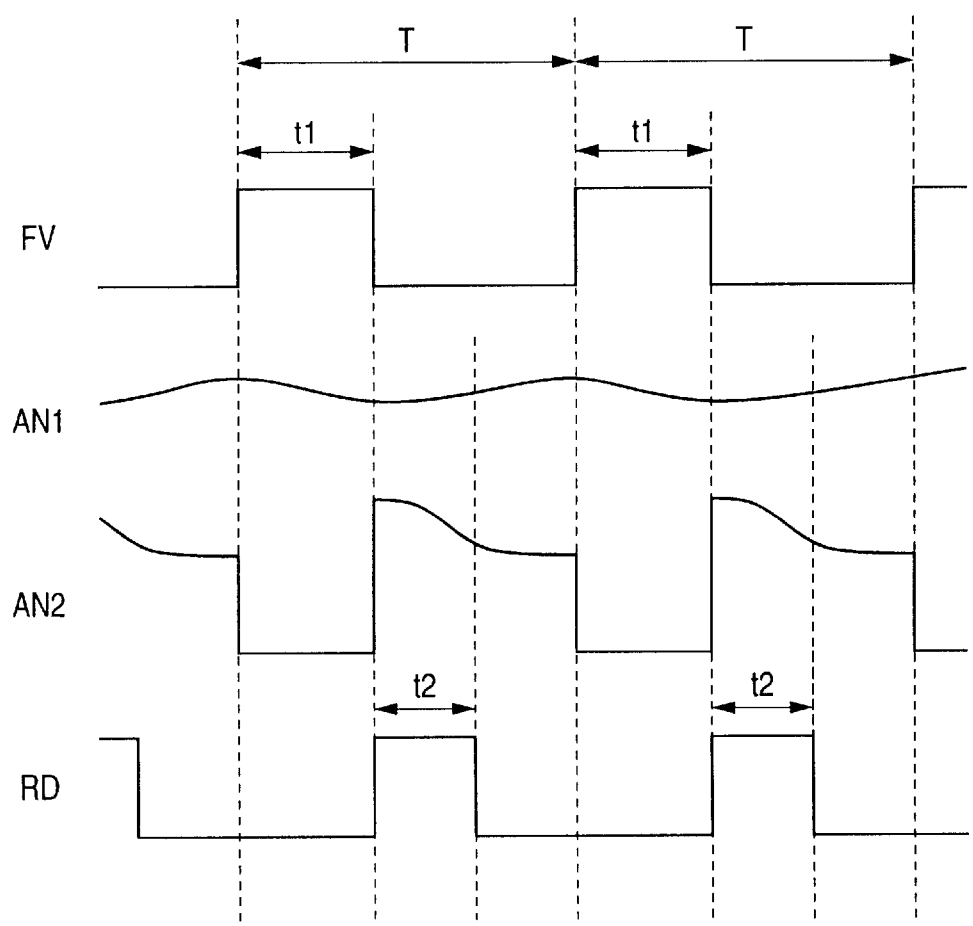
FIG. 31 is a view of signal waveforms showing the operation of the DC motor driving apparatus at the time of the positive rotation of the DC motor in FIG. 30.
Figure 32:
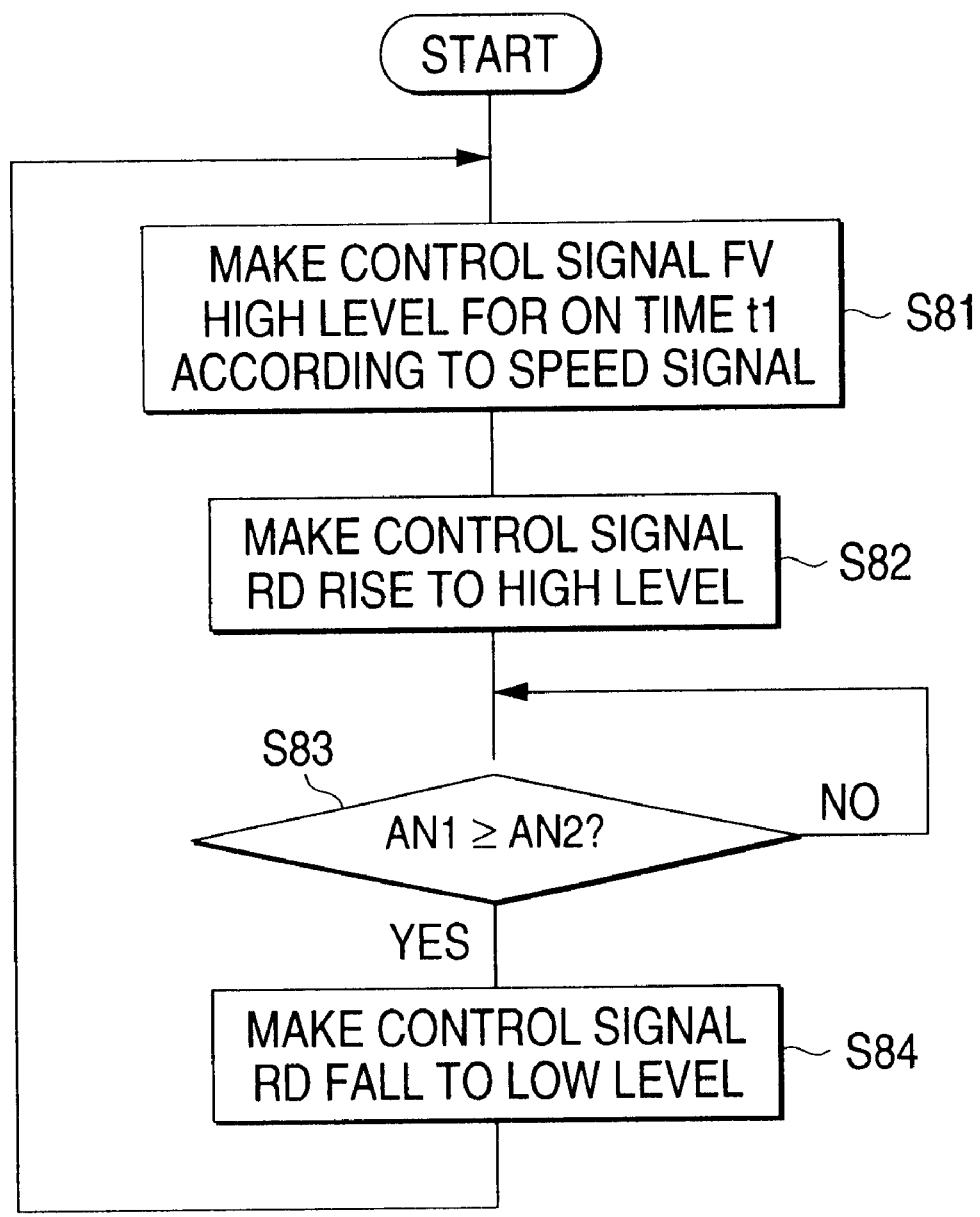
FIG. 32 is a flow chart showing the operation of the CPU at the time of positive rotation of the DC motor in FIG. 30.
Figure 33:
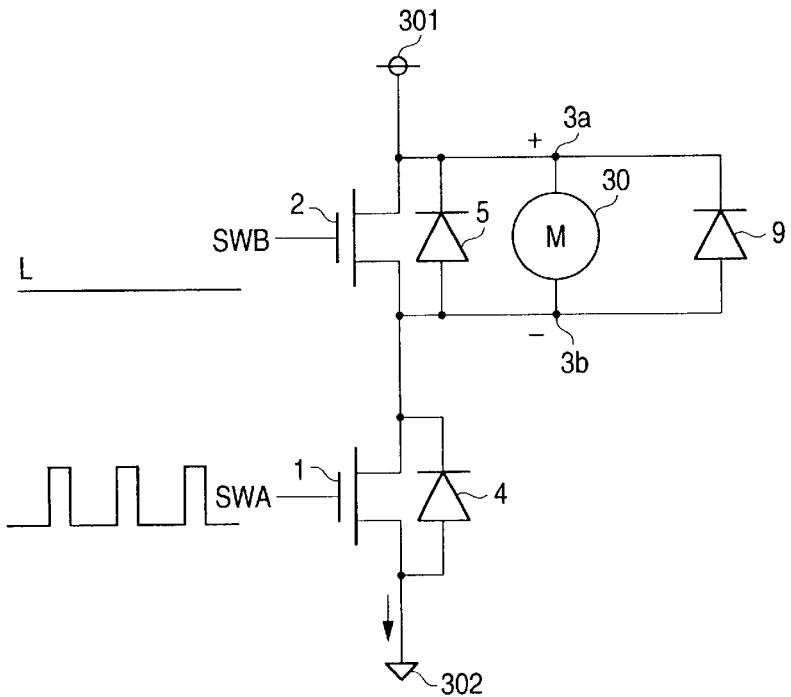
FIG. 33 is a circuit diagram showing an example of the conventional DC motor driving apparatus.
Figure 34:
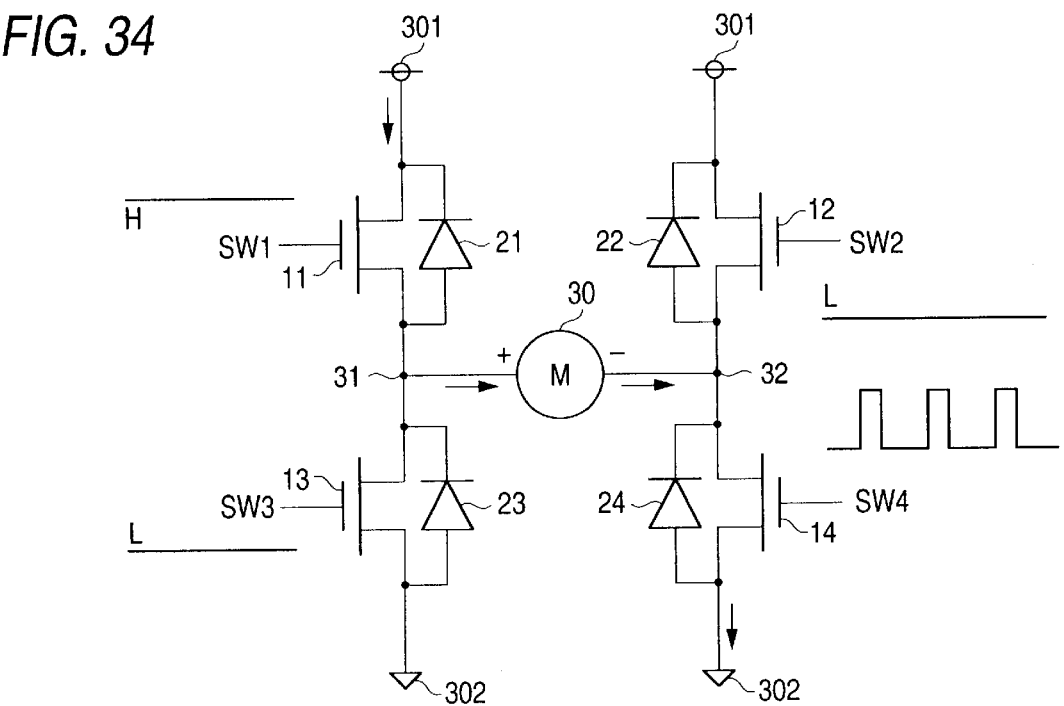
FIG. 34 is a circuit diagram showing another example of the conventional DC motor driving apparatus.
Figure 35:
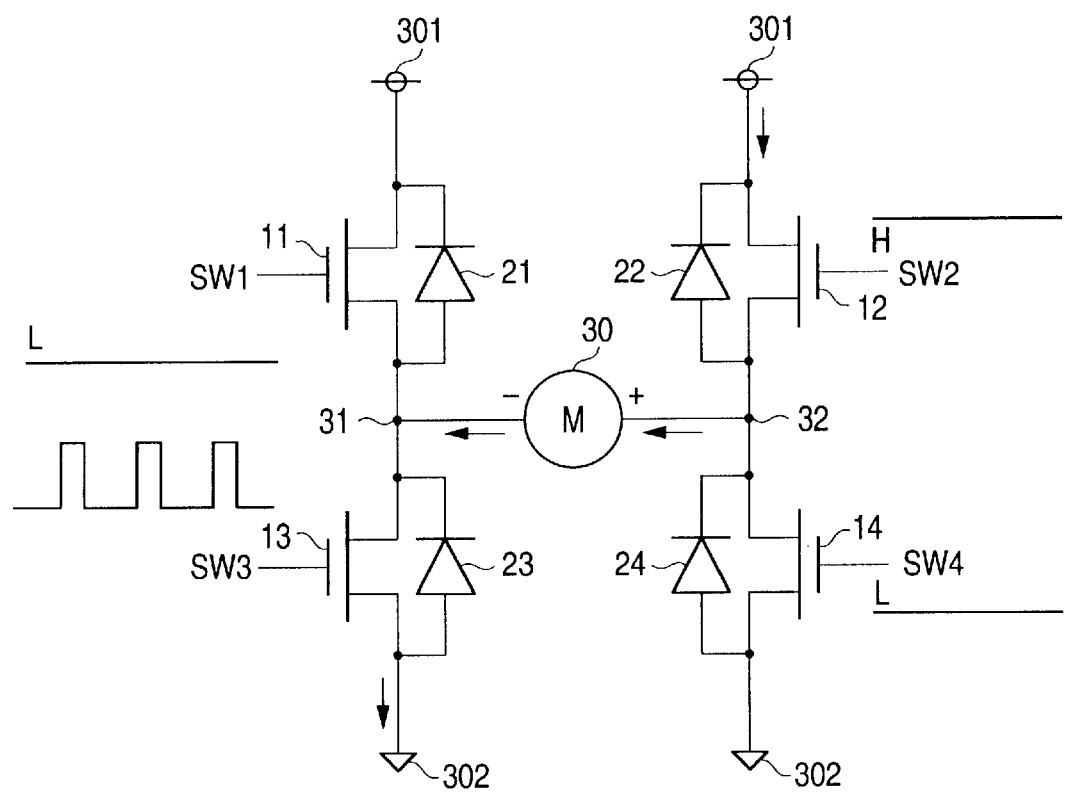
FIG. 35 is a circuit diagram showing another example of the conventional DC motor driving apparatus.

FIG. 31 is a view of the signal waveforms showing the operation of the DC motor driving apparatus 608 at the time of the positive rotation of the DC motor 3 in FIG. 30. Further, FIG. 32 is a flow chart showing the operation of the CPU 208 of the DC motor driving apparatus 608 at the time of the positive rotation of the DC motor 3 in FIG. 30.

The CPU 208 makes the control signal FV high level for the ON time t1 according to the speed signal supplied from the receiver (step S81). Thereby, the FET 1 is turned ON. As the result, the current flows from the power supply terminal 301 to the ground terminal 302 through the terminal 3a, DC motor 3, terminal 3b and FET 1, and the DC motor 3 is positively rotated. At this time, the CPU 208 makes the control signal RD low level. Thereby, the FET 2 is turned OFF. Further, because the potential of the terminal 3a of the DC motor 3 is higher than the potential of the terminal 3b, the level of the analog signal AND outputted from the buffer amplifier 64 is higher than the level of the analog signal AN2 outputted from the buffer amplifier 65.

When the control signal FV is low level, the FET 1 is turned OFF. Thereby, the current does not flow to the DC motor 3. In this case, the counter electromotive force is generated in the DC motor 3, and the potential of the terminal 3b is higher than the potential of the terminal 3a. Thereby, the level of the analog signal AN2 outputted from the buffer amplifier 65 is higher than the level of the analog signal AN1 outputted from the buffer amplifier 64.

Next, the CPU 208 makes the control signal RD rise to the high level (step S 82). Thereby, the FET 2 is turned ON. As the result, the regenerative current flows from the terminal 3b to the terminal 3a through the FET 2, by the counter electromotive force generated in the DC motor 3, and the counter electromotive force is deleted.

When the potential of the terminal 3b of the DC motor 3 is lower than the potential of the terminal 3a, the level of the analog signal AN2 outputted from the buffer amplifier 64 is lower than the level of the analog signal AN1 outputted from the buffer amplifier 64. When the CPU 208 detects that the level of the analog signal AN1 is higher than the level of the analog signal AN2 (step S83), the CPU 208 makes the control signal RD fall to the low level (step S84). Thereby, the FET 2 is turned OFF.

As described above, by comparing the levels of the analog signals AN1 and AN2 outputted from buffer amplifiers 64 and 65, the FET 2 can be made to turn ON only when the counter electromotive force is generated in the DC motor 3. Accordingly, it is prevented that terminals 3a and 3b of the DC motor 3 are short circuited and the DC motor 3 is braked, under the condition that the regenerative current does not flow.

By repeating the processes of steps S81 to S84 at a predetermined period T, the speed control of the DC motor 3 at the time of the positive rotation can be conducted.

In the DC motor driving apparatus 608 of the present embodiment, according to the analog signals AN1 and AN2 outputted from buffer amplifiers 64 and 65, the FET 2 can be made to turn ON only when the counter electromotive force is generated in the DC motor 3. Accordingly, in the same manner as in the DC motor driving apparatus 606 in FIG. 22, in addition to the effect of the DC motor driving apparatus 601 in FIG. 3, the effect that the counter electromotive force generated in the DC motor 3 can be more assuredly deleted, can be obtained.

Besides, as a switching means, for example, there are a bipolar transistor, a junction FET, an IGBT, and a trielectrode AC switch as a transistor type switching means, and there are a relay, and a vacuum valve as other type switching means.

What is claimed is:

1. A DC motor driving apparatus to drive a DC motor, which comprising:
   a first transistor which is inserted into a current path to supply the current from a DC power supply to said DC motor, and controlled to be turned ON/OFF;
   a second transistor connected between a pair of terminals of said DC motor; and
   a control circuit for comparing the potential of both terminals of said second transistor, for turning ON said second transistor when the counter electromotive force is generated in said DC motor, and for turning OFF said second transistor when the counter electromotive force has disappeared in said DC motor.

2. The DC motor driving apparatus according to claim 1, wherein said control circuit includes:
   a comparator by which the potential of both ends of said second transistor are compared, and which detects that the counter electromotive force is generated in said DC motor, and outputs a detection signal; and
   a control signal generation circuit to generate a control signal to turn ON said second transistor corresponding to the detection signal outputted from said comparator.

3. A DC motor driving apparatus to drive a DC motor, which comprising:
   a first transistor which is inserted into a current path to supply the current from a DC power supply to said DC motor, and controlled to be turned ON/OFF;
   a second transistor connected between a pair of terminals of said DC motor; and
   a calculation processing unit which is operated according to a program, and turns ON said second transistor for a predetermined period of time while said first transistor is turned OFF.

4. A DC motor driving apparatus to positively rotate and reversely rotate a DC motor, which comprising:
   a first transistor which is connected between one potential side of a DC power supply and one terminal of said DC motor, and is turned ON at the time of a positive rotation;
   a second transistor which is connected between the one potential side of said DC power supply and the other terminal of said DC motor, and is turned ON at the time of a reversal rotation;
   a third transistor which is connected between the other potential side of said DC power supply and the one terminal of said DC motor, and is turned OFF at the time of the positive rotation, and ON/OFF controlled at the time of the reversal rotation;
   a fourth transistor which is connected between the other potential side of said DC power supply and the other terminal of said DC motor, and ON/OFF controlled at the time of the positive rotation, and turned OFF at the time of the reversal rotation;
   a first control circuit for comparing the potential of both terminals of said first transistor for turning ON said first transistor when the counter electromotive force is generated in said DC motor at the time of the reversal rotation for turning OFF said first transistor when the counter electromotive force has disappeared in said DC motor at the time of the reversal rotation; and
   a second control circuit for comparing the potential of both terminals of said second transistor, for turning ON said second transistor when the counter electromotive force is generated in said DC motor at the time of the positive rotation, and for turning OFF said second transistor when the counter electromotive force has disappeared at the time of the positive rotation.

5. The DC motor driving apparatus according to claim 4, wherein said first control circuit includes:
   a first comparator which compares the potential of both ends of said first transistor, and at the time of reversal rotation, detects that the counter electromotive force is generated in said DC motor, and outputs the first detection signal; and a first control signal generation circuit to generate the first control signal to turn ON said first transistor corresponding to the first detection signal outputted from said first comparator, and said second control circuit includes:

a second comparator which compares the potential of both ends of said second transistor, and at the time of positive rotation, detects that the counter electromotive force is generated in said DC motor, and outputs the second detection signal; and a second control signal generation circuit to generate the second control signal to turn ON said second transistor corresponding to the second detection signal outputted from said second comparator.

6. A DC motor driving apparatus to positively rotate and reversely rotate a DC motor, which comprising:

a first transistor which is connected between one potential side of a DC power supply and one terminal of said DC motor, and is turned ON at the time of a positive rotation;

a second transistor which is connected between the one potential side of said DC power supply and the other terminal of said DC motor, and is turned ON at the time of a reversal rotation;

a third transistor which is connected between the other potential side of said DC power supply and the one terminal of said DC motor, and is turned OFF at the time of the positive rotation, and ON/OFF controlled at the time of the reversal rotation;

a fourth transistor which is connected between the other potential side of said DC power supply and the other terminal of said DC motor, and ON/OFF controlled at the time of the positive rotation, and turned OFF at the time of the reversal rotation; and a calculation processing unit which is operated according to a program, and turns ON said first transistor for a predetermined period of time while said third transistor is turned OFF at the time of the reversal rotation, and turns ON said second transistor for a predetermined period of time while said fourth transistor is turned OFF at the time of the positive rotation.

7. A DC motor driving apparatus to drive a DC motor, which comprising:

a first switching means which is inserted into a current path to supply the current from a DC power supply to said DC motor, and ON/OFF controlled;

a second switching means which is connected between a pair of terminals of said DC motor; and a control means for comparing the potential of both ends of said second switching means, for turning ON said second switching means when the counter electromotive force is generated in said DC motor, and for turning OFF said second switching means when the counter electromotive force has disappeared in said DC motor.

8. The DC motor driving apparatus according to claim 7, wherein said control means includes:

a counter electromotive force detection means for comparing the potential of both ends of said second switching means, and detecting that the counter electromotive force is generated in said DC motor; and a switching control means for turning ON said second switching means corresponding to the detection of the counter electromotive force by said counter electromotive force detection means.

9. A DC motor driving apparatus to drive a DC motor, which comprising:

a first switching means which is inserted into a current path to supply the current from a DC power supply to said DC motor, and ON/OFF controlled;

a second switching means which is connected between a pair of terminals of said DC motor; and a calculation processing means for operating according to a program, and for turning ON said second switching means for a predetermined time while said first switching means is turned OFF.

10. A DC motor driving apparatus to positively rotate and reversely rotate a DC motor, which comprising:

a first switching means which is connected between one potential side of a DC power supply and one terminal of said DC motor, and turned ON at the time of the positive rotation;

a second switching means which is connected between one potential side of said DC power supply and the other terminal of said DC motor, and turned ON at the time of the reversal rotation;

a third switching means which is connected between the other potential side of said DC power supply and one terminal of said DC motor, and turned ON at the time of the positive rotation, and ON/OFF controlled at the time of the reversal rotation;

a fourth switching means which is connected between the other potential side of said DC power supply and the other terminal of said DC motor, and turned ON at the time of the positive rotation, and turned OFF at the time of the reversal rotation;

a first control means for comparing the potential of both ends of said first switching means, and for turning ON said first switching means when the counter electromotive force is generated in said DC motor, at the time of the reversal rotation; and a second control means for comparing the potential of both ends of said second switching means, and for turning ON said second switching means when the counter electromotive force is generated in said DC motor, at the time of the positive rotation.

11. The DC motor driving apparatus according to claim 10, wherein said first control means includes:

a first counter electromotive force detection means for comparing the potential of both ends of said first switching means, and detecting that the counter electromotive force is generated in said DC motor at the time of the reversal rotation; and a first switching control means for turning ON said first switching means corresponding to the detection of the counter electromotive force by said first counter electromotive force detection means, and said second control means includes:

a second counter electromotive force detection means for comparing the potential of both ends of said second switching means, and detecting that the counter electromotive force is generated in said DC motor, at the time of the positive rotation; and a second switching control means for turning ON said second switching means corresponding to the detection of the counter electromotive force by said second counter electromotive force detection means.

12. A DC motor driving apparatus to positively rotate and reversely rotate a DC motor, which comprising:

a first switching means which is connected between one potential side of a DC power supply and one terminal of said DC motor, and turned ON at the time of the positive rotation;

a second switching means which is connected between one potential side of said DC power supply and the other terminal of said DC motor, and turned ON at the time of the reversal rotation;

a third switching means which is connected between the other potential side of said DC power supply and one terminal of said DC motor, and turned OFF at the time of the positive rotation, and ON/OFF controlled at the time of the reversal rotation;

a fourth switching means which is connected between the other potential side of said DC power supply and the other terminal of said DC motor, and ON/OFF controlled at the time of the positive rotation, and turned OFF at the time of the reversal rotation; and a calculation processing means for operating according to a program, and for turning ON said first switching means for a predetermined time while said third switching means is turned OFF at the time of the reversal rotation, and for turning ON said second switching means for a predetermined time while said fourth switching means is turned OFF at the time of the positive rotation.

13. The DC motor driving apparatus according to claim 3, wherein a predetermined time is the time previously determined to delete the counter electromotive force generated in said DC motor.

14. The DC motor driving apparatus according to claim 6, wherein a predetermined time is the time previously determined to delete the counter electromotive force generated in said DC motor.

15. The DC motor driving apparatus according to claim 9, wherein a predetermined time is the time previously determined to delete the counter electromotive force generated in said DC motor.

16. The DC motor driving apparatus according to claim 12, wherein a predetermined time is the time previously determined to delete the counter electromotive force generated in said DC motor.

* * * * *